US008860790B2

(12) United States Patent
Ericson et al.

(10) Patent No.: US 8,860,790 B2
(45) Date of Patent: Oct. 14, 2014

(54) RENDERING IMPROVEMENT FOR 3D DISPLAY

(75) Inventors: Thomas Ericson, Oslo (NO); Christian Moller, Olso (NO); Ola Haavik, Oslo (NO); Jorn Karlsen, Oslo (NO); Doug Patterson, London (GB)

(73) Assignee: Setred AS, Oslow (NO)

( * ) Notice: Subject to any disclaimer, the term of this patent is extended or adjusted under 35 U.S.C. 154(b) by 1187 days.

(21) Appl. No.: 12/675,937

(22) PCT Filed: Aug. 29, 2008

(86) PCT No.: PCT/GB2008/002933
§ 371 (c)(1),
(2), (4) Date: Jan. 24, 2011

(87) PCT Pub. No.: WO2009/027691
PCT Pub. Date: Mar. 5, 2009

(65) Prior Publication Data
US 2011/0109629 A1  May 12, 2011

(30) Foreign Application Priority Data

Aug. 29, 2007 (GB) .................... 0716776.0

(51) Int. Cl.
*H04N 13/04* (2006.01)
*H04N 13/02* (2006.01)
(52) U.S. Cl.
CPC ....... *H04N 13/0409* (2013.01); *H04N 13/0275* (2013.01); *H04N 13/0225* (2013.01); *H04N 13/022* (2013.01)
USPC .......................................................... 348/51

(58) Field of Classification Search
USPC .......................................................... 348/51
See application file for complete search history.

(56) References Cited

U.S. PATENT DOCUMENTS

| 4,740,073 | A | | 4/1988 | Meacham |
| 4,853,769 | A | | 8/1989 | Kollin |
| 5,132,839 | A | * | 7/1992 | Travis ............................ 359/462 |
| 5,392,140 | A | * | 2/1995 | Ezra et al. ........................ 349/15 |
| 5,465,175 | A | * | 11/1995 | Woodgate et al. ............. 359/463 |
| 5,678,089 | A | | 10/1997 | Bacs et al. |
| 5,699,112 | A | | 12/1997 | Bacs, Jr. |

(Continued)

FOREIGN PATENT DOCUMENTS

| EP | 0 541 374 | 5/1993 |
| EP | 0 625 861 | 11/1994 |

(Continued)

OTHER PUBLICATIONS

Holliman, 3D Display System, Feb. 2, 2005, Dept. of Computer Science, Univ. of Durham, pp. 1-45.*

(Continued)

*Primary Examiner* — Sath V Perungavoor
*Assistant Examiner* — Peter D Le
(74) *Attorney, Agent, or Firm* — Patterson Thuente Pedersen, P.A.

(57) ABSTRACT

A method of creating image data, the image data suitable for use with an autostereoscopic display, the method comprising taking a plurality of samples of a 3D scene, each sample taken for the combination of a pixel on a 2D display and an aperture of the autostereoscopic display, wherein the center line of projection for all samples for a particular aperture pass through substantially the same point of the aperture.

43 Claims, 13 Drawing Sheets

(56) References Cited

U.S. PATENT DOCUMENTS

| | | | |
|---|---|---|---|
| 5,808,792 A * | 9/1998 | Woodgate et al. | 359/463 |
| 5,825,541 A * | 10/1998 | Imai | 359/464 |
| 5,875,055 A | 2/1999 | Morishima et al. | |
| 5,880,704 A | 3/1999 | Takezaki | |
| 5,930,037 A * | 7/1999 | Imai | 359/463 |
| 5,991,073 A * | 11/1999 | Woodgate et al. | 359/462 |
| 5,991,551 A | 11/1999 | Bacs et al. | |
| 6,014,164 A | 1/2000 | Woodgate et al. | |
| 6,055,013 A * | 4/2000 | Woodgate et al. | 348/59 |
| 6,128,132 A | 10/2000 | Wieland et al. | |
| 6,172,807 B1 | 1/2001 | Akamatsu | |
| 6,204,967 B1 * | 3/2001 | Morishima et al. | 359/462 |
| 6,324,347 B1 | 11/2001 | Bacs, Jr. et al. | |
| 6,377,295 B1 | 4/2002 | Woodgate et al. | |
| 6,603,504 B1 | 8/2003 | Son et al. | |
| 6,674,463 B1 * | 1/2004 | Just et al. | 348/43 |
| 6,712,471 B1 | 3/2004 | Travis et al. | |
| 6,795,241 B1 | 9/2004 | Holzbach | |
| 6,927,886 B2 | 8/2005 | Plesniak et al. | |
| 6,970,290 B1 | 11/2005 | Mashitani et al. | |
| 7,023,466 B2 | 4/2006 | Favalora et al. | |
| 7,043,073 B1 | 5/2006 | Holzbach | |
| 7,046,271 B2 | 5/2006 | Doerfel et al. | |
| 7,573,491 B2 | 8/2009 | Hartkop et al. | |
| 7,633,528 B2 | 12/2009 | Fukushima et al. | |
| 7,652,665 B2 | 1/2010 | Fukushima et al. | |
| 8,179,424 B2 | 5/2012 | Moller | |
| 2001/0045951 A1 | 11/2001 | Allen | |
| 2002/0063807 A1 * | 5/2002 | Margulis | 348/745 |
| 2003/0058209 A1 * | 3/2003 | Balogh | 345/87 |
| 2003/0128871 A1 | 7/2003 | Naske et al. | |
| 2004/0057111 A1 | 3/2004 | Dominguez Motntes | |
| 2004/0070556 A1 | 4/2004 | Weitbruch et al. | |
| 2004/0165263 A1 | 8/2004 | Sudo et al. | |
| 2005/0099688 A1 | 5/2005 | Uehara et al. | |
| 2005/0117216 A1 * | 6/2005 | Lee | 359/464 |
| 2005/0219693 A1 * | 10/2005 | Hartkop et al. | 359/462 |
| 2005/0264560 A1 * | 12/2005 | Hartkop et al. | 345/419 |
| 2005/0264881 A1 * | 12/2005 | Takagi et al. | 359/463 |
| 2005/0275942 A1 * | 12/2005 | Hartkop et al. | 359/464 |
| 2006/0012878 A1 | 1/2006 | Lipton et al. | |
| 2006/0066612 A1 * | 3/2006 | Yang et al. | 345/419 |
| 2006/0233446 A1 | 10/2006 | Saito et al. | |
| 2006/0262376 A1 * | 11/2006 | Mather et al. | 359/248 |
| 2007/0126921 A1 * | 6/2007 | Gallagher et al. | 348/362 |
| 2008/0018732 A1 * | 1/2008 | Moller | 348/51 |
| 2008/0043092 A1 * | 2/2008 | Evans et al. | 348/36 |
| 2008/0043096 A1 * | 2/2008 | Vetro et al. | 348/51 |
| 2008/0211734 A1 * | 9/2008 | Huitema et al. | 345/3.1 |
| 2008/0212153 A1 * | 9/2008 | Haussler et al. | 359/32 |
| 2009/0160757 A1 * | 6/2009 | Robinson | 345/102 |
| 2009/0309887 A1 | 12/2009 | Moller et al. | |
| 2010/0026795 A1 | 2/2010 | Moller et al. | |
| 2010/0039499 A1 * | 2/2010 | Nomura et al. | 348/43 |

FOREIGN PATENT DOCUMENTS

| | | |
|---|---|---|
| EP | 0804042 | 10/1997 |
| EP | 0 847 208 | 6/1998 |
| EP | 0 860 728 | 8/1998 |
| EP | 1 089 573 A2 | 4/2001 |
| EP | 1 401 216 | 3/2004 |
| GB | 2 206 763 | 1/1989 |
| GB | 2 405 043 | 2/2005 |
| GB | 2 405 517 | 3/2005 |
| GB | 2 406 730 | 4/2005 |
| GB | 2 406 731 | 4/2005 |
| GB | 2 428 344 | 1/2007 |
| JP | 58199321 | 11/1983 |
| JP | 62153833 | 7/1987 |
| JP | 03119889 | 5/1991 |
| JP | 09171156 | 6/1997 |
| JP | 10-322726 | 12/1998 |
| JP | 2004-246153 | 9/2004 |
| KR | 20050016344 | 2/2005 |
| WO | WO98/43441 | 10/1998 |
| WO | WO 03/054797 | 7/2003 |
| WO | WO03/090479 | 10/2003 |
| WO | WO 2005/106572 | 11/2005 |
| WO | WO 2005/112474 A1 | 11/2005 |

OTHER PUBLICATIONS

Kaufman, Voxels as a Computational Representation of Geometry, 1996, Computer Science Dept., SUNY at Stony Brook, pp. 1-45.*

Chen et al., Light Field Mapping: Efficiient Representation and Hardware Rendering of Surface Light Fields, 2002, ACM SIGGRAPH, pp. 1-10.*

Lin et al., A Geometric Analysis of Light Field Rendering, 2004, Microsoft Research Asia, pp. 1-18.*

Banks et al., Why is Spatial Stereoresolution So Low?, 2004, The Journal of Neurosicence, pp. 1-13.*

Chuang, Image Warping/Morphing, 2005, Digital Visual Effects, pp. 1-20.*

Stereographics® Developers' Handbook; Background on Creating Images for CrystalEyes® and SimulEyes®; 1997 SteroGraphics Corporation; 66 pages.

International Search Report for International Application No. PCT/GB2007/001407 dated Jul. 17, 2007.

International Search Report for International Application No. PCT/GB2007/001406 dated Jul. 24, 2007.

International Search Report for International Application No. PCT/IB2005/001480 dated Dec. 21, 2005.

Application and File History for U.S. Appl. No. 11/569,048, filed May 8, 2007, inventor Moller.

Application and File History for U.S. Appl. No. 12/297,581, filed Jan. 30, 2009, inventors Moller et al.

Application and File History for U.S. Appl. No. 12/297,590, filed Feb. 4, 2009, inventors Moller et al.

* cited by examiner

RENDERING IMPROVEMENT FOR 3D DISPLAY

PRIORITY CLAIM

The present application is a National Phase entry of PCT Application No. PCT/GB2008/002933, filed Aug. 29, 2008, which claims priority from British Application No. 0716776.0, filed Aug. 29, 2007, the disclosures of which are hereby incorporated by reference herein in their entirety.

TECHNICAL FIELD

The present invention is directed towards a method for rendering images representing a three-dimensional scene. In embodiments of the present invention, the images will reproduce a three-dimensional scene when shown with an autostereoscopic display apparatus.

BACKGROUND ART

A well proven method for creating a 3D image is to cause a viewer to see different perspective views of a scene with each eye. One way to do this is to display two differently polarized images on a screen, and for the viewer to wear corresponding polarizing filters on each eye.

An autostereoscopic display or a three dimensional (3D) display may be implemented using an aperture or slit array in conjunction with a two dimensional (2D) display to display a 3D image. The principle of the device is that when looking at a 2D image through a slit array, the slit array separated from the screen by a distance, the viewer sees a different part of the 2D image with each eye. If an appropriate image is rendered and displayed on the 2D display, then a different perspective image can be displayed to each eye of the viewer without necessitating them to wear filters over each eye.

One important parameter which governs quality in most 3D display technologies is the number of perspectives that can be presented by a 3D display. This leads to challenges in calculating image information to give sufficient animation rate. The system cost may be reduced if calculations can be performed using standard graphics processing units.

Further, autostereoscopic displays give rise to image distortions for virtual scenes that extend in front or behind a central display plane. These are the result of a number of factors, many related to the fact that a continuous scene is represented with a device which is discrete. Examples of image distortions include lines becoming jagged, which may be referred to as tearing, and thin vertical features or other small features disappearing.

Known rendering methods do not minimise image distortions in an effective way. They may optimize the rendering for a set number of viewing positions. This means that image distortions will accumulate in certain observation positions. Viewers of a display will move freely so it may be advantageous if discontinuities are spread evenly.

Known rendering methods require significant hardware resources, typically graphics processing units, and may give rise to slow image update. This may be overcome by using additional hardware resources, which in turn leads to higher cost.

SUMMARY

In view of the above identified problems, the following methods and apparatus are disclosed herein. Embodiments of the invention demonstrate ways in which image data may be calculated to give high image quality and real-time performance.

The invention disclosed herein may be implemented in the scanning slit time-multiplexed system described in PCT application PCT/IB2005/001480, incorporated herein by reference. However, the invention may also be used in conjunction with other display systems. For example, a similar system where the scanning slit in a shutter in front of the display is replaced with a device that creates a slit shaped scanning backlight to give the same effect may be used. In this case the scanning backlight may be treated as the shutter. The aperture in the shutter and the shape of the backlight may have a shape other than a slit.

The scanning slit system creates the 3D effect by showing different pictures to different locations in front of the display at high speed. It achieves this by combining a high frame rate 2D display with a shutter. The shutter is synchronised with the display and ensures that different portions of the 2D display are visible only from specific locations. The left image in FIG. 1 shows how a viewer looking through a narrow slit will see two distinct regions, one for each eye. To create a 3D display from this simple slit system, the slit must shift laterally sufficiently quickly so that a viewer sees the scanning shutter as a transparent window. If all the slits are updated quickly enough to be perceived as flicker-free, a viewer will see the full resolution of the underlying 2D display from any position. The 2D display shows different images synchronised with the opening of slits in the shutter, as shown in the right image in FIG. 1.

There is provided a method of creating image data, the image data suitable for use with an autostereoscopic display, the method comprising taking a plurality of samples of a 3D scene, each sample taken for the combination of a pixel on a 2D display and an aperture of the autostereoscopic display, wherein the center line of projection for all samples for a particular aperture pass through substantially the same point of the aperture.

Further, there is provided a method of creating image data, the image data suitable for use with an autostereoscopic display arranged to display parallax in one dimension only wherein each aperture of the autostereoscopic display is a slit, the method comprising taking a plurality of samples of a 3D scene, each sample taken for the combination of a pixel on a 2D display and an aperture of the autostereoscopic display, wherein the center line of projection for all samples for a particular aperture substantially pass through a center line of the aperture, said center line of the aperture aligned with the long axis of the aperture.

The center line of projection for all samples may substantially pass through a viewing line. The viewing line may be arranged substantially perpendicular to the center line of the aperture.

The center line of projection for all samples for a particular pixel may pass through substantially the same point of the pixel. The center line of projection for all samples for a particular pixel may pass through substantially the same point of the pixel, but different apertures.

The plurality of samples may be substantially evenly distributed. The plurality of samples for a particular aperture may be substantially evenly distributed in at least one of: the display plane and the viewing plane. The plurality of samples for a particular pixel are substantially evenly distributed in at least one of: the shutter plane and the viewing plane.

The plurality of samples may be obtained by assuming an aperture width that is narrower than the physical aperture width.

Each sample may comprise a center sample, each center sample taken along the center line of projection. Each sample may comprise an average of a plurality of off-center samples, where the off-center samples are distributed around the center line of projection. The off-center samples may be taken along lines parallel to the center line of projection. The off-center samples may be taken along lines that are at an angle to the center line of projection, in which case the off-center sample lines may intersect the center line of projection. The intersection point may be in the plane of the aperture array. Each sample may comprise an average of a center sample and a plurality of off-center samples, wherein each center sample is taken along the center line of projection, and the off-center samples are distributed around the center line of projection. Each off-center sample may be offset from the center line of projection in at least one of a vertical distance and a horizontal distance. The off-center samples may be evenly distributed around the center line of projection.

The off-center samples may be distributed by stochastic jittering. Stochasting jittering is a technique that may be used to hide artifacts, in which small offsets may be added to the sampling positions. The sampling positions are offset by different random factors. A maximum offset distance may be defined, which may be equivalent to the distance between samples. The offsets may have any probability distribution function. This function may be a Gaussian distribution. The offsets may also be governed by a look-up table to provide a pseudo random distribution.

The average may be a weighted average.

There is also provided a method further comprising: generating at least one full perspective image and an associated depth map, the depth map defining the z-direction for each pixel of the full perspective image; determining how pixels would be translated for a pre-defined perspective change using the depth map; and using image interpolation to create a new perspective from which at least one of the plurality of samples can be taken.

There is also provided a method further comprising: calculating a first perspective view of the 3D scene from a first position, calculating a second perspective view of the 3D scene from a second position, interpolating a third perspective view of the 3D scene from a third position, the third position being closer to the first position than the second position, the interpolation comprising: transforming the second perspective view to a view from the third position and storing said transformed second perspective view in a buffer, transforming the first perspective view to correspond to a view from the third position and storing said transformed first perspective view in the buffer such that the pixel values of the transformed second perspective view are overwritten unless no information for that pixel value is provided by the transformed first perspective view.

The method may further comprise taking a sample from at least one of the first, second and third perspective views. Any pixel not defined in an interpolated view may be given a value equal to the nearest calculated pixel value.

A sample for a particular combination of pixel of the 2D display and aperture of the autostereoscopic display may be only calculated if that sample is determined to be used for determining the value for a pixel that will be viewable on the autostereoscopic display. The known way of performing interpolation would result in calculation of a number of pixel values corresponding to shutter positions that do not exist. Thus pixel values are calculated that will not be shown on the display, wasting processing capacity.

A sample may be taken such that the center line of projection passes through both the center point or line on the aperture and the center of the pixel on the 2D display. A sample or off-center sample may be taken such that the center line of projection passes through both the center point or line on the aperture and any point of the pixel on the 2D display. Each sample may be taken such that the center line of projection passes through the center of the aperture. Each sample may be taken such that the center line of projection passes through a point or line on the aperture which is offset from the center of the aperture. The point or line on the aperture which is offset from the center of the aperture may be at least one of: an edge of the virtual aperture and the midpoint between two adjacent virtual apertures.

The method may further comprise applying a low pass filter to the 3D scene prior to a sample being taken. The low pass filter has a low pass frequency dependent on a z-value of the 3D scene. The low pass filter may have a low pass frequency dependent on z-value of the 3D scene and on the width of the 3D pixel for that z-value. The dependence of the low pass frequency may be identified by use of a lookup table.

The method may further comprise applying tessellation to the 3D scene prior to a sample being taken. The method may further comprise tessellating triangles larger than a threshold value into smaller triangles. The threshold value for tessellation may be dependent on the z-value of the vertices of the triangle.

Volumetric data of the 3D scene may be stored in a 3D data structure such that any voxel value can be found through a read operation. At least one sample may be taken using ray tracing. At least one sample may be taken using rasterization.

The method may further comprise taking at least one sample by performing a transformation and a projection, wherein the transformation comprises calculating a transformation dependent on the geometry of the autostereoscopic display and the projection comprises calculating a projection dependent on a projection plane.

The method may further comprise taking a plurality of samples of the 3D scene for at least one further aperture of the autostereoscopic display. The method may further comprise taking a plurality of samples of the 3D scene for all apertures of the autostereoscopic display.

The group of pixel and aperture combinations for which samples are taken may be optimized for at least one of: a particular viewing line, a particular viewing area, a particular viewing volume a particular volume of the 3D scene, and a characteristic of the autostereoscopic display. The viewing line, viewing area or viewing volume is the line, area or volume for which the displayed image is optimized. Such optimization may be arranged so as to give a correct perspective view when the display is viewed from the viewing line, area or volume.

There is also provided an autostereoscopic display apparatus arranged to perform the method disclosed herein.

There is also provided a graphics processing apparatus for use in a computer system having an autostereoscopic display, the graphics processing apparatus arranged to perform the method disclosed herein.

There is also provided a graphics processing apparatus for use in an autostereoscopic display, the graphics processing apparatus arranged to perform the method disclosed herein.

There is also provided a computer program product comprising code means stored on a computer readable medium for performing the method disclosed herein.

There is also provided a method of creating image data, the image data suitable for use with an autostereoscopic display, the image data reproducing a 3D scene when shown on an autostereoscopic display, the autostereoscopic display device comprising a switchable aperture array and a screen, the method comprising: generating an image from a number of perspective samples, the number of perspective samples being higher than the number of independent viewing positions that the display can provide. The display may have horizontal parallax only and the defined range of viewer positions may be a line. The perspective samples may be either zero spacing or equal spacing in the aperture plane.

The perspective samples may have either zero spacing or equal spacing in the display plane. The perspective samples may have either zero spacing or equal spacing in the observation plane. The perspective samples may have either zero spacing or equal spacing on both the display plane and the aperture plane. The perspective samples may also have equal spacing in the observation plane. The rendering method may reduce image artefacts for an observer positioned along the line of observation.

BRIEF DESCRIPTION OF THE DRAWINGS

Non-limiting embodiments of the present invention will be described by way of example with reference to the accompanying drawings, in which.

DETAILED DESCRIPTION OF THE DRAWINGS

3D Display Scene Representation

Figure 1:
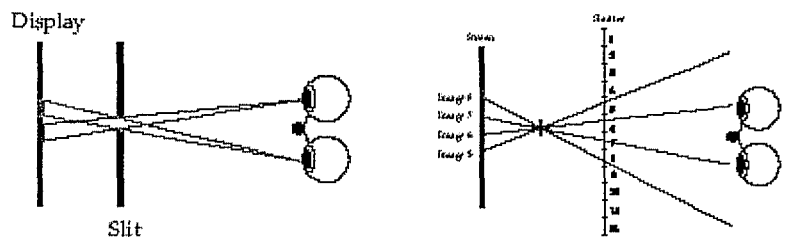
FIG. 1 describes the operation of a scanning slit system
Figure 2:
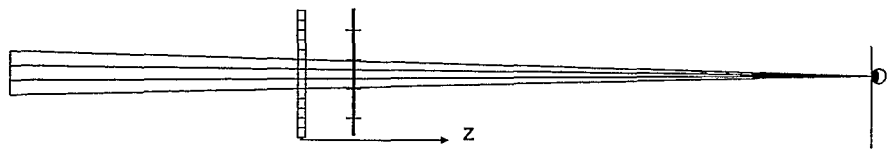
FIG. 2 shows a 2D display frustum

In order to describe how a 3D display can represent a scene one may consider a moving observer. This is because understanding a 3D display for a moving observer is more challenging than a stationary observer. At least for a scanning slit system, a stationary observer could have the display reproduce the scene with the same accuracy for a given depth as a 2D display. As one can see in FIG. 2 the pixels in a 2D display can be seen to represent cones from the point of the observer. These will be wider the further away from the observer one goes in the scene. For simplicity only three pixels that are all seen through the same slit are shown.

Figure 3:
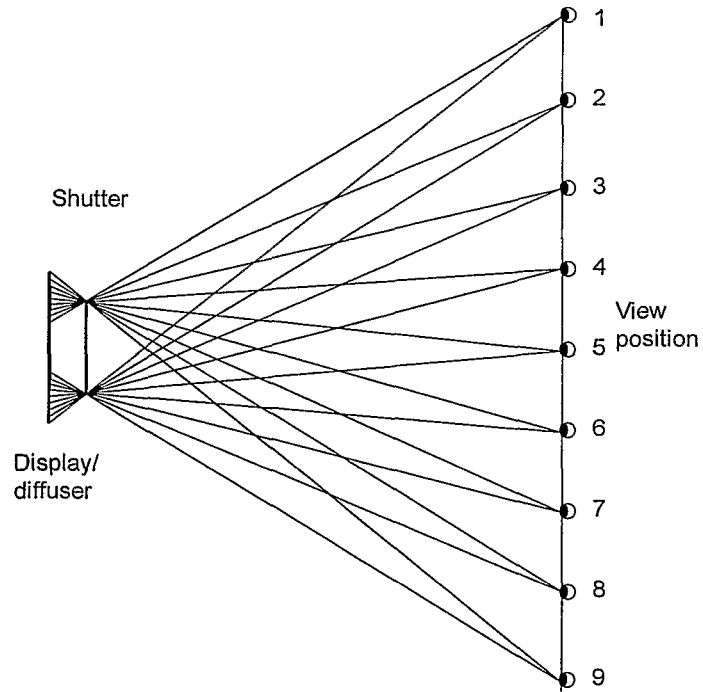
FIG. 3 shows a number of view positions for a scanning slit system

One way to describe a 3D display is that it is a directional display that can show different perspectives for different viewer positions. There are many different ways to achieve this effect. FIG. 3 illustrates an example of how a scanning slit system may display nine distinct viewing positions. A shutter filters the information on the display such that different images are seen from each of the nine viewing positions. This is based on an example where the 3D display has horizontal parallax only, and one may then optimise the rendering for viewing along a line at a given distance from the display. The distance, height and width of the line may vary according to viewer preferences. Note that the case where the shutter is placed in front of the display will be used for this description. The same methods will also apply to a solution where the shutter is behind the display by means of a stripe or point light source.

Figure 4:
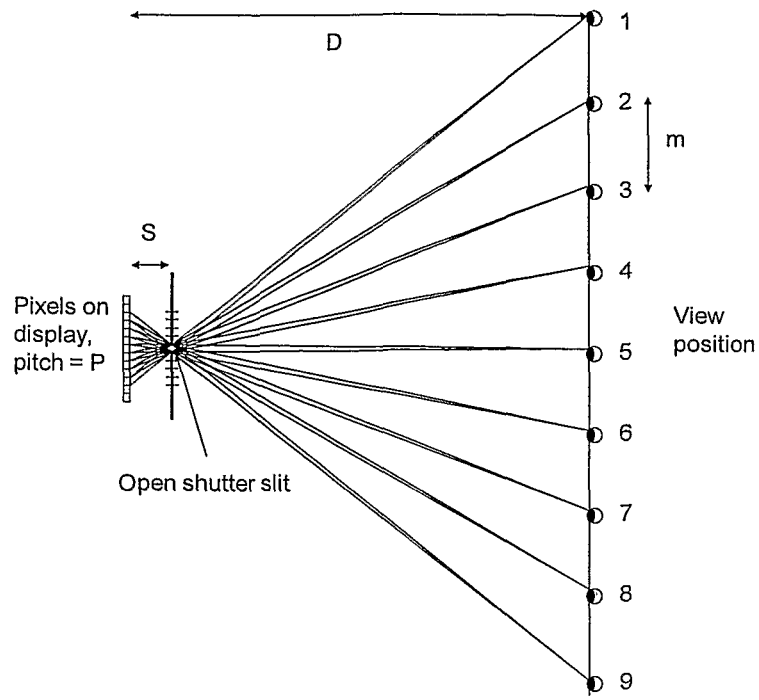
FIG. 4 shows a number of view positions for a specific shutter slit

FIG. 4 shows an image of the partial frustums for the nine viewing positions for one shutter slit. In this example only one pixel is visible behind each shutter slit and a different pixel is seen from each of the nine viewing positions. In order to achieve this, the display shows nine different 2D frames, each synchronised with the relevant shutter slit. In this example there is no overlap between the images seen from each of the nine viewing positions. The images could simply be different images or TV channels or they could represent different perspectives of a 3D scene. In this example the observer needs to move a distance m in order to see a new image where no elements of the previous image are seen. By equal triangles one may show that this distance is given by:

$$m = \frac{P(D-S)}{S} \qquad \text{Equation 1}$$

Figure 5:
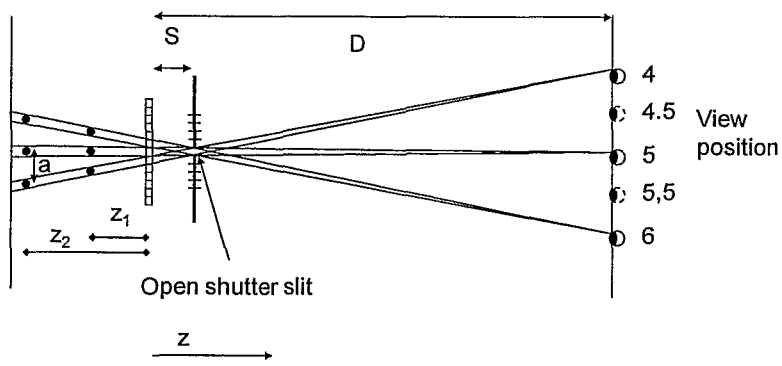
FIG. 5 shows intermediary view positions for a specific shutter slit

The above example is a simplification of a real viewer situation in a number of aspects. First, a viewer may in many instances be positioned in between the nine view positions indicated. In this example the viewer will see part of the two adjacent positions from such intermediate positions. For a viewer moving freely there is nothing unique about the nine viewing positions, so he or she will be just as likely to be positioned at any intermediate position. At the intermediary positions the image may be considered to be an interpolated image between two adjacent numbered positions. Even though the nine numbered positions may have no significance for the viewer, the distance m is relevant in that it represents the rate at which new perspective information can be presented when moving from one extreme viewing position to the other, e.g. from position 1 to 9 in this example. FIG. 5 shows that if the different perspectives would represent points sampled along a line from the numbered view positions through the center of the shutter slit, the spacing between samples would be different for a given distance from the shutter plane. This spacing, indicated by the letter a, may be described according to:

$$a = \frac{P(S-z)}{S} \quad \text{Equation 2}$$

Choosing to sample along those lines or frustums is somewhat arbitrary since the observer is just as likely to be positioned at an intermediary view position, exemplified by observer position 4.5 and 5.5. One may instead sample with lines or frustums going from these intermediary positions and give the pixels a value based on an average or weighted average between the two, e.g. the pixel centered with view position 5 may be given the average value from intermediary positions 4.5 and 5.5.

The above example represents a special case in that exactly the width of a pixel in the display plane is seen through the shutter slit. From equal triangles it can be shown that this is only the case when the following specific conditions are met.

$$\frac{P}{\Delta e} = \frac{D}{D-S} \quad \text{Equation 3}$$

where $\Delta e$ is the shutter slit width and S, D and P defined as above.

Figure 6:
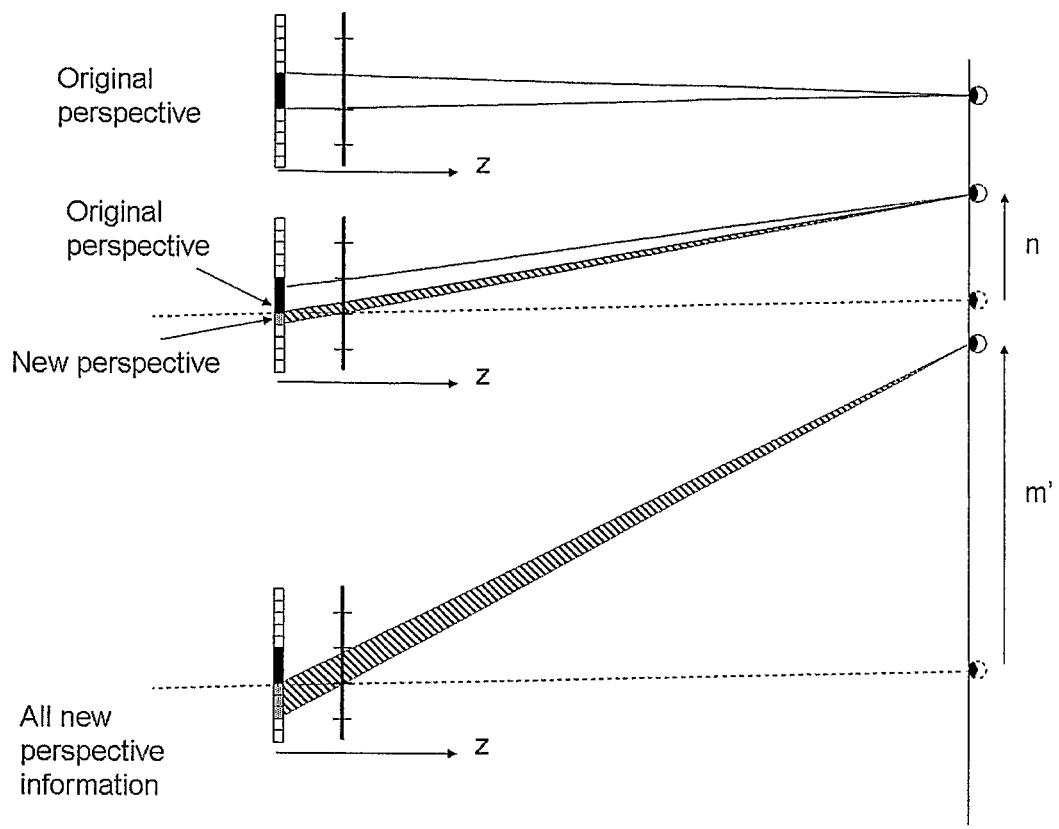
FIG. 6 shows how the perspective information changes as the viewer moves

There may be situations where one would like to use the display where these conditions are not met. This gives rise to additional considerations when rendering data. FIG. 6 shows an example where the width of three pixels is seen through a single shutter slit. In this case $\Delta e > P$, but a similar analysis may be made for $P > \Delta e$. An arbitrary observer position is chosen to represent an original perspective. As the observer moves away from this position, new parts of the display will be seen through the slit. These parts may show new perspective information. Nevertheless, part of the original perspective may still be seen until the observer moves sufficiently far away from the original observer position. By equal triangles the distance may be shown to be:

$$m' = D \times \frac{\Delta e}{S} \quad \text{Equation 4}$$

The proportion of new and original perspective information changes linearly with n and may be described as:

$$\frac{\text{New}}{\text{Total}} = \frac{n}{m'} = \frac{nS}{\Delta eD} \quad \text{Equation 5}$$

Equation 1 governs how far the viewer needs to move to see a full new pixel. Substituting this value into Equation 5 one gets:

$$\frac{\text{New}}{\text{Total}} = \frac{m}{m'} = \frac{P}{\Delta e} \times \frac{D-S}{D} \quad \text{Equation 6}$$

This may be seen as the ratio between the rate at which new perspective information can be added to the rate at which old perspective information remains present, as an observer moves along the line of observation. Combining Equation 3 and Equation 6 one will get a ratio of 1, which is what one would expect for the situation where exactly one pixel is seen through each shutter slit.

Both the new and original perspective information may be correct for one particular observation position. However, one could then define this as the original perspective position and make the same analysis again. What this shows is merely that unless the display knows exactly where the observer will be positioned, it will introduce an error for most observer positions. The error may be thought of as an imprecision in the representation of a scene.

Figure 7:
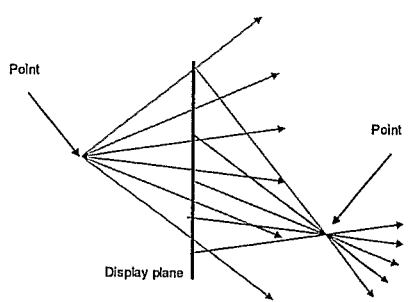
FIG. 7 shows a number of light rays from two points in space

Because the position of the viewer may be arbitrary and unknown it may at this point be helpful to use a different model to describe the 3D display. A 3D display may be described as a display that can reproduce different light rays, which may also be called light vectors, going through a selected plane in space. FIG. 7 shows selected light rays from two arbitrary points in space that go through a display plane. The description below will mainly be based on views where the y-direction of the light rays is not seen, which is most significant for a horizontal parallax system. The analysis can be extended to also include vertical parallax using the same methods.

Although light in many cases can be treated as rays (geometrical optics) there are cases where the wave properties of light must be considered, e.g. with interference/diffraction. However, in the following analysis diffraction will be ignored and a pure geometrical approach will be used.

Figure 8:
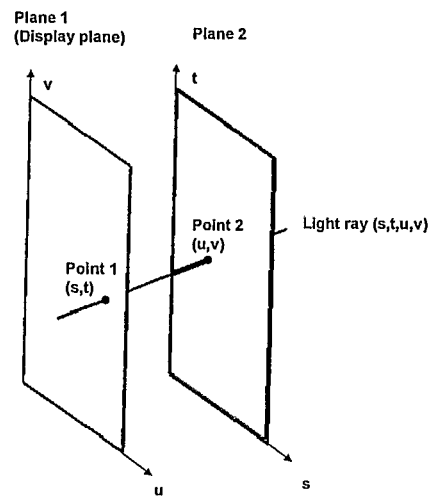
FIG. 8 shows how two points may define a light ray

A light ray's unique direction can be determined by two points in space which the ray passes through. By tracing this ray back to the object and assuming the light has traveled through air, the radiance can be determined. Although this is a simplified model of a true light field it simplifies the ray tracing analysis considerably. The light ray $L(s,t,u,v)$ is thus uniquely determined by two points, or 4 variables in a 4D space, as shown in FIG. 8. However, for a more detailed analysis on light fields a 5D plenoptic function could be considered or even a more sophisticated approach that considers dimensions such as time, light wavelength, etc. In the 4D space analysis light rays will have a constant radiance and colour as it travels through space.

One may select the display plane as one of two planes that are used to define the two points in space. In order to perfectly reproduce a real scene one would need to reproduce an infinite number of light rays. This would mean that each point on one plane would have light rays going through an infinite number of points on the other plane and vice versa. In effect the light rays will make up a continuous light field.

A real display will deviate from the perfect situation in that it cannot set the value of each light ray independently. A 3D display pixel will be defined as the range of light rays that the display can only address jointly. The case where this range of light rays takes on the same value will be considered here, even though there may be cases where the light rays may take on different but not independent values. A real display may also be limited in the overall range of light rays that can be represented, i.e. it has limited viewing angles.

Figure 9:
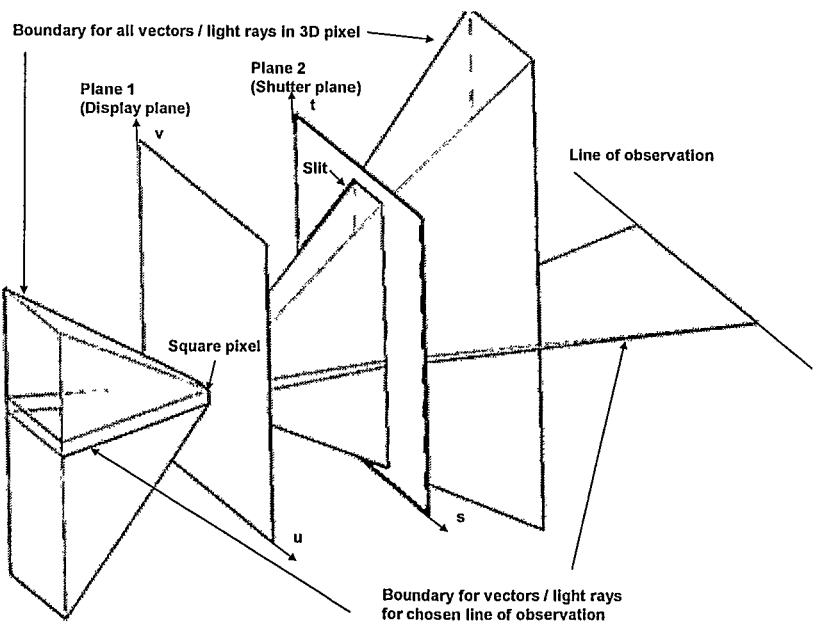
FIG. 9 shows the boundaries for all light rays passing through the same 3D pixel

In a scanning slit system one may regard the combination of a display pixel and shutter aperture to define a 3D pixel. In fact, one may model any autostereoscopic display in this way. In the most common implementation of the system the 3D pixel may only take on one value in terms of colour and intensity. In terms of defining light rays it simplifies the analysis to choose the display plane and the shutter plane as the two parallel planes. The 3D pixel represents a range of light rays, as shown in FIG. 9. This range can be defined as all the light rays that go through the same display pixel and the same shutter aperture. The case where pixels are square and shutter apertures are vertical slits will be described in detail, while a similar analysis can be extended to any shape of pixels and apertures. Because this particular system does not have vertical parallax a line of observation may be chosen and only the light rays going through this line are considered relevant. It should also be noted that there may be black areas both on the display and the shutter that cannot be addressed, which would introduce 3D pixel gaps. One example of this would be black gaps between pixels, which many 2D displays have.

If all light rays were to have equal weighting for the value of the 3D pixel then the value of the 3D pixel may be determined by a double integral. The first integral would integrate the intensity function for all light rays passing through the area of the slit for a single point on the display pixel. The second integral would integrate the first integral over the area of the display pixel. For the case where only the light rays passing through the line of observation are considered relevant the values to integrate over becomes slightly more complex. The first integral would then integrate the intensity function for all light rays passing through the area of the slit and the line of observation for a single point on the display pixel. In effect this means that one integrates over a horizontal line on the shutter slit for a given point on the display pixel. The second integral would still integrate the first integral over the area of the display pixel. With the intensity function being $L(s,t,u,v)$ one may express the double integral as:

$$3D\text{pix} = \int_{Pixel} \int_{Slit} L(s,t,u,v) \qquad \text{Equation 7}$$

In a more advanced model one may introduce a transfer function $a(s,t,u,v)$, which effectively gives a weighting of the different light rays. In this case one would integrate the product of the L and a functions.

Figure 10:
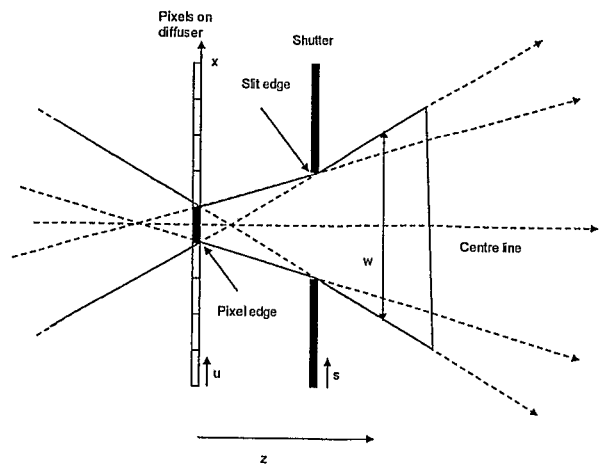
FIG. 10 shows a 3D pixel from above

FIG. 10 shows a cross section of the two planes from above looking down the y-axis. For this particular cross section the integral in Equation 7 may be written as:

$$3Dpix = \int_{-P/2}^{P/2} \int_{-\Delta e/2}^{\Delta e/2} L(s,t,u,v) \partial s \partial u, \qquad \text{Equation 8}$$

where P is the pixel width and $\Delta e$ the shutter slit width

In order to determine the full 3D pixel value one would need to integrate Equation 8 in the y direction over the height of the pixel. In a discrete system Equation 8 may be described as a sum:

$$3Dpix = \sum_{-P/2}^{P/2} \sum_{-\Delta e/2}^{\Delta e/2} L(s,t,u,v), \qquad \text{Equation 9}$$

where P is the pixel width and $\Delta e$ the shutter slit width

By drawing the boundary light rays from the edges of the display pixel and the shutter slit one may define the area that the light rays from the 3D pixel sweeps. One may observe that the area is bounded by the light rays going from opposite edges of the shutter slit and the pixel everywhere except in the region between the shutter and the display. In this region the area is bounded by the light rays going from the same edge on the shutter slit and pixel. The width of the area swept by the light rays will be called w and will vary with z according to:

$$w = \frac{\Delta e \times \text{abs}(z)}{S} + \frac{P \times \text{abs}(S-z)}{S} \qquad \text{Equation 10}$$

Figure 11:
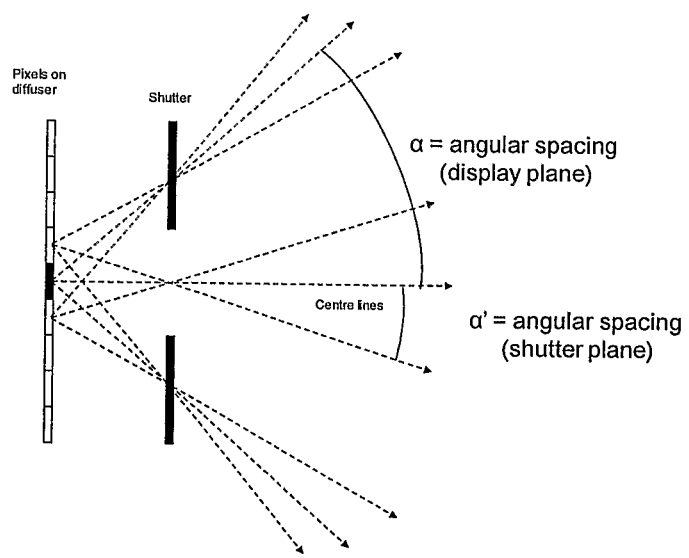
FIG. 11 shows the center line for a adjacent 3D pixels

FIG. 11 shows the center lines for a number of adjacent 3D pixels. It shows that these center lines intersect both in the display plane and the shutter plane. Because of this there are two alternative ways of describing these center line light rays. One may either describe them as groups of light rays going through the center of the pixels with a certain angular spacing, or as groups of light rays going through the center of the shutter slits with another angular spacing. In the example in FIG. 11 the shutter slits are wider than the display pixels. Hence, the groups of center lines will be more closely spaced in the display plane than in the shutter plane, but on the other hand the angular spacing will be larger within the groups in the display plane than in the shutter plane.

One thing to note is that the angular spacing will in this example not be uniform within a group of light rays. Instead it becomes smaller with larger viewing angles.

Figure 12:
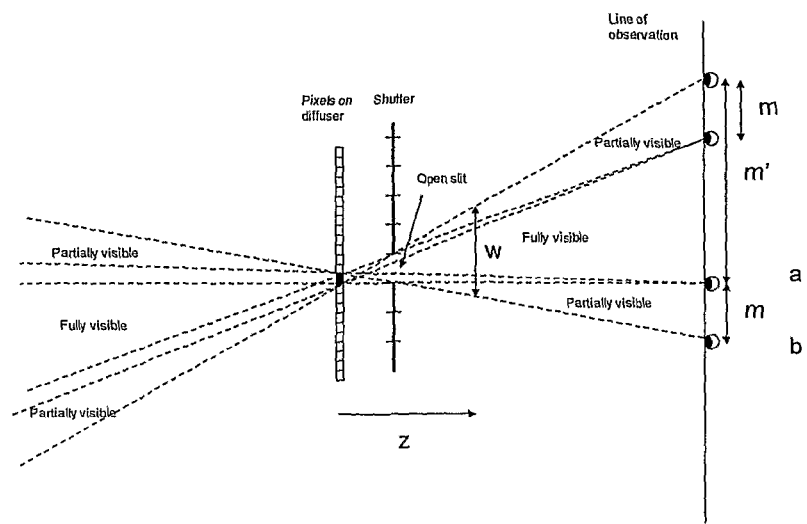
FIG. 12 shows where a pixel is fully and partially visible

To fully understand the situation one may introduce the viewer to the analysis again. FIG. 12 shows a viewer positioned at a distance D from the display plane. It shows the viewing positions from which a 2D pixel will be wholly or partially visible. The width of this viewing zone can be obtained by substituting z=D into Equation 10, i.e. the area defining the 3D pixel. One may also see that it relates to the distances defined by Equation 1 and Equation 4. It is noted that for some viewing positions the 2D pixel is fully visible and for some viewing positions it is only partially visible. Another thing to note is that if one selects a point somewhere along the z-direction it will be fully visible, i.e. visible through all points on the pixel in some areas, whereas it will only be partially visible, i.e. visible only through part of the pixel in some areas. This may be relevant if several samples are taken to determine the value of the 3D pixel and one wishes to put different weighting on these samples.

Figure 13:
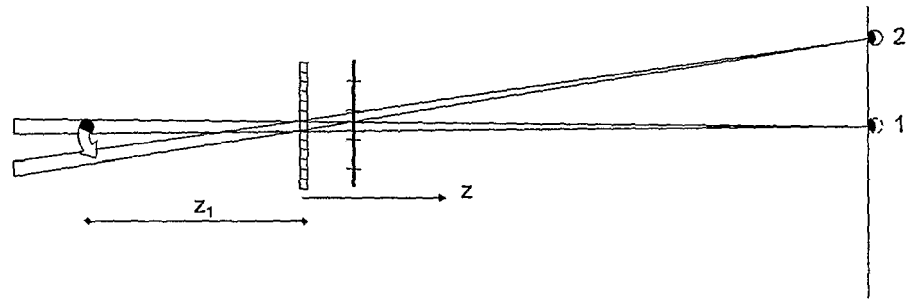
FIG. 13 shows how a point appears to move as the viewer changes position

In a 3D display the 3D pixel may represent an object anywhere in the z-direction. It will be other references that determine where an observer perceives the object to be. FIG. 13 shows the viewing cones for a 2D pixel that is seen through the same slit for both viewing positions. Both cones therefore represent a range of light rays that form part of the same 3D pixel. Hence, they are forced to have the same colour and intensity. Other references make the viewer perceive a point at depth $z_1$ for position 1 in this example. As the observer moves from position 1 to position 2 the point will appear to move. The further away from the display plane it is, the more it will move. It will depend on other references exactly how the point seems to move. It may move both within the z-plane and along the z-axis. This effect is similar to the effect experienced when an observer moves the head in a goggle based stereo system without head tracking. The scene will appear to change even though the same perspectives are still shown. For a scanning slit system this will give rise to a local perspective error. The 3D pixel defined in FIG. 10 may be seen as a measure of the maximum amount a point may appear to move and hence the amount of error.

The references that determine how a point appears to move may typically be the perspective seen by the observer's other eye and the parallax experienced from movements of the head.

Figure 14:
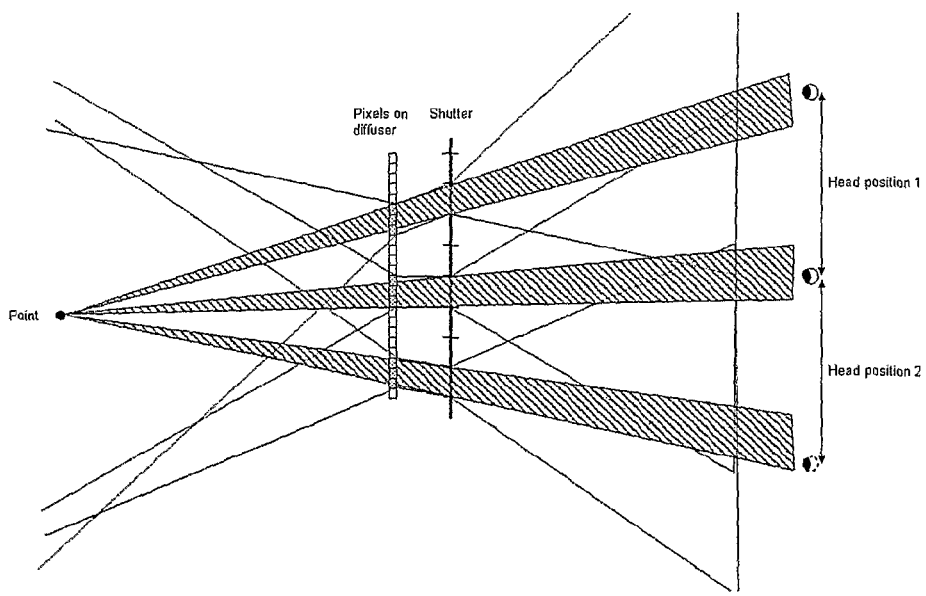
FIG. 14 shows how different 3D pixels represent the same point

FIG. 14 shows a point behind the display plane. It is assumed that a rendering method is used such that the point will set the value of three pixels behind each shutter slit. The narrow grey cones going from the point show the range of light rays that go through the point and these pixels. However, by setting the value of these pixels, one is also forced to set the value for the 3D pixel representing the selected 2D pixel and shutter slit combinations. The image shows three such 3D pixels for head position 1 and head position 2. One can see that the area where all 3D pixels overlap is relatively large and it may be seen to represent the uncertainty as to where the point is located. From Equation 10 one may deduce that the area of uncertainty will depend on the pixel size, slit size, shutter display separation and the distance away from the display plane.

Figure 15:
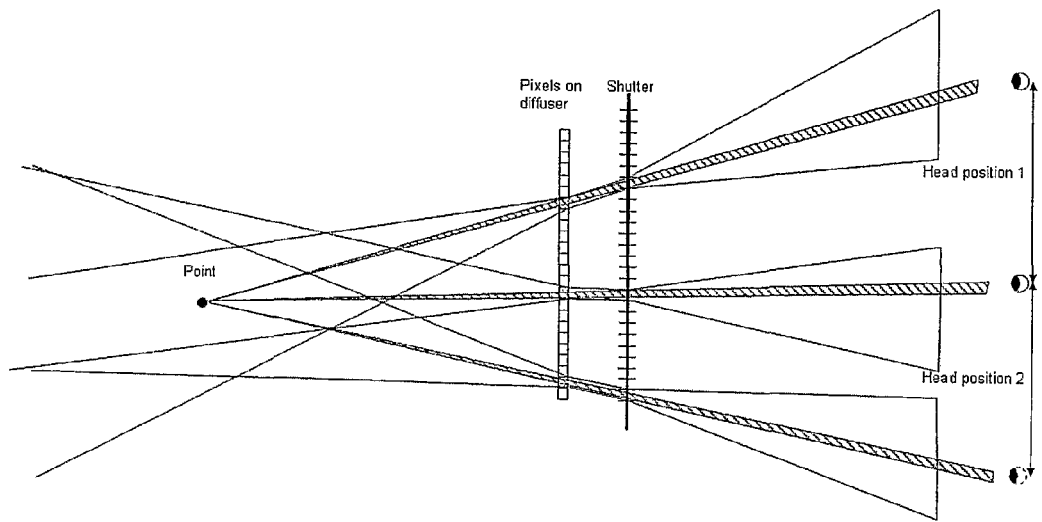
FIG. 15 shows other 3D pixels representing the same point as in FIG. 14

FIG. 15 shows an example where the shutter slit width is reduced. The area of uncertainty is significantly reduced.

3D Image Generation

An image generation scheme will produce one or a number of 2D images that reproduce a 3D scene when shown on a 3D display. One may do so by sampling a vector or light ray that goes through the virtual scene in order to determine the value of a pixel for a certain slit position. This is the method used in ray tracing. The line along which the sample is taken, i.e. the sampling vector or light ray, may be referred to as a center line of projection. When 2D anti-aliasing is used in ray tracing, sampling is performed along more than one line and then a pixel is given a value based on these samples. These other sample lines may be distributed around the center line of projection. In rasterization one does not sample along a line in the same way as in ray tracing, instead the algorithm checks if an object falls within the frustum for a particular pixel and camera position and then each pixel is given a value based on this. The center of this frustum may be referred to as the center line of projection. When 2D anti-aliasing is used in rasterization each pixel is typically divided into a number of sub-pixels and then the original pixel is given a value based on the value of these sub-pixels. The following analysis will give similar conclusions for both ray tracing and rasterization. Where one method may be used for the description a similar description could be made using the other method.

As the above analysis shows, each pixel and shutter slit combination (i.e each 3D pixel) represents an infinite number of light rays within a certain range. Hence, there are many different ways to generate the 2D images for display at the display plane. Different methods will produce a different visual result for the observer.

Two known methods will be analysed in relation to the display scene representation described above. Methods to improve the visual result will be presented.

1. General Rendering Method (GRM)

A general rendering method (GRM) was described in patent application PCT/IB2005/001480. The GRM provides a good benchmark for rendering of an idealised display with very thin slits and very fine details in the scene. In this regard, a very thin slit is a slit having width substantially equal to pixel width, and very fine detail is scene detail having an angular diameter substantially equal to one pixel resolution.

Equation 11 is one of the key equations for GRM. The GRM transforms the scene such that all perspectives for one shutter slit can be captured through a standard perspective rendering operation. It provides the transformation for the x-coordinate that may be performed before or after the normal perspective rendering step. It should be noted that in a practical implementation they need not be two separate steps, and they may be implemented in a single equation. Nevertheless, it is useful to separate the two steps when trying to understand the problems involved.

$$x_1 = \left(1 - \frac{z_0}{D}\right)\left(\frac{Sx_0}{S-z_0} - \frac{Se}{S-z_0} + e\right) \qquad \text{Equation 11}$$

One may start by considering the ideal case. In the ideal case the GRM transformation does not change the information in a way that gives rise to any distortions when the standard perspective rendering operation is performed. This is the case if all triangles have constant z-values or if each element in the scene is sufficiently small.

Figure 16:
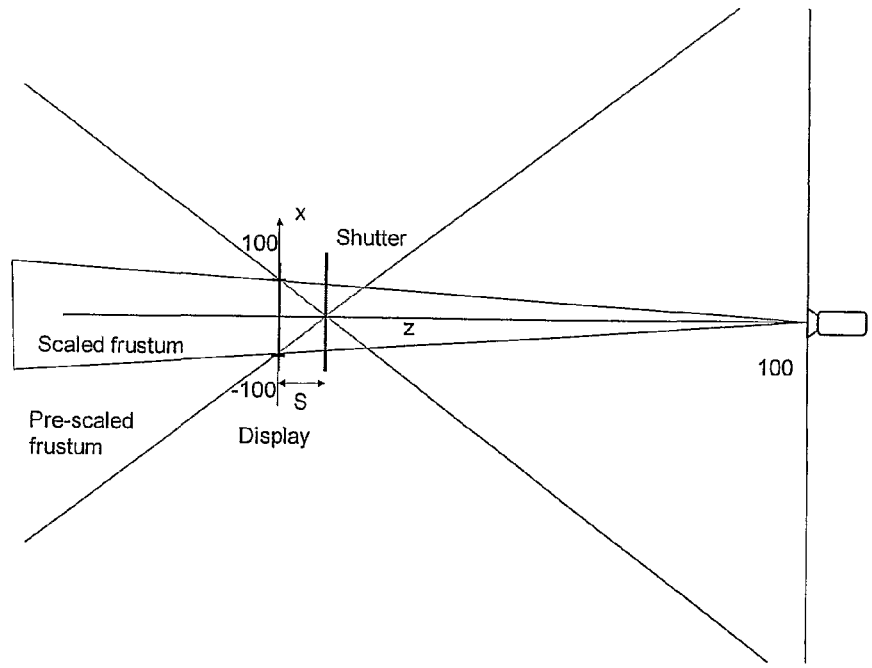
FIG. 16 shows the same frustum in scaled and pre-scaled space

In order to understand how this rendering method takes samples of the 3D scene one can translate the rendering operation, which performs the sampling, in the transformed or scaled space to the pre-scaled space, i.e. the original scene space. In the scaled space a normal camera is set up with a given frustum. FIG. 16 shows a camera positioned at z=100, the shutter at z=10 and the display at z=0. For the slit centered around x=0 the frustum intersects the display at x=100 and x=−100.

By inserting the scaled values in Equation 11 one can calculate the pre-scaled frustum. FIG. 16 also shows the pre-scaled space that the camera captures. The shape makes sense. At z=100 it covers the line of observation, it crosses in the shutter plane z=10 where the equation assumes an infinitely narrow slit, and intersects the display plane at the same points in both pre-scaled and scaled space.

Figure 18:
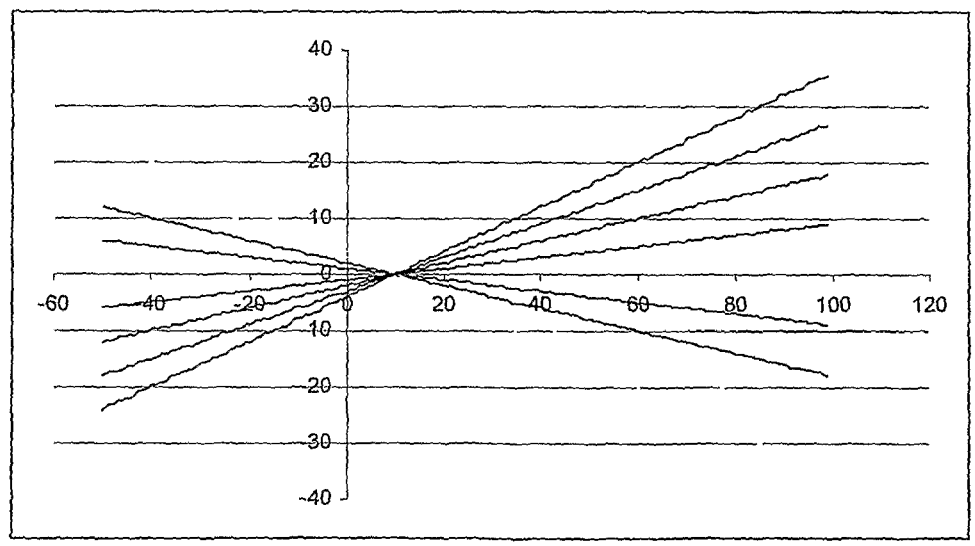
FIG. 18 shows pixel frustums in pre-scaled space

The actual samples that are taken will be when a pixel is given a value in the scaled space. If there are 200 pixels in the display plane for the frustum in question, the pixels will have a pitch of 1 in the display plane. In the base example, using the ray tracing analogy, the camera will take samples along lines going from the camera position through the center of each pixel in the scaled space. FIG. 18 shows the lines for a number of adjacent pixels converted to the pre-scaled space. Comparing to FIG. 11 one will see that this is the same as sampling along the center line for all the 3D pixels going through the shutter slit in question. There may be small features or other high frequency elements in the original scene, which may call for sampling along even more lines. If 2D anti-aliasing is used for the standard projection step this may be equivalent to adding one or more lines in between the lines shown in FIG. 18 and sample along these. The final pixel value may then be determined by taking an average or weighted average between adjacent lines. Using rasterization one would instead say that the pixels are divided into sub-pixels and then the original pixel would be given a value based on these. By using this method one may reduce image artefacts experienced by the viewer. This method will increase the number of light rays sampled going through the center of the slit. However, it ignores taking samples for light rays that go through other parts of the slit.

Figure 19:
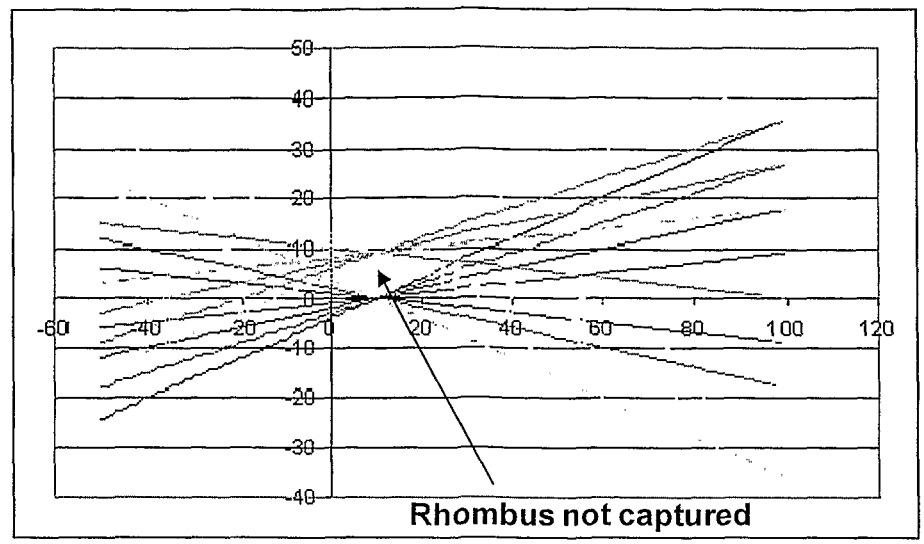
FIG. 19 shows pixel frustums for two adjacent shutter slits in pre-scaled space

The center lines for the 3D pixels exemplified in FIG. 11 also intersect at the display plane. GRM handles this through the different samples taken when rendering the image for other slit positions. For a basic case this will involve shifting the pre-scaled frustum one slit width sideways. The camera shift gives rise to a slightly different transformation of the scene since e takes a different value in Equation 11. FIG. 19 shows two adjacent frustums in the pre-scaled space. An interesting thing to note is that there is a space shaped as a rhombus, between the two frustums close to the shutter plane, which will not be captured by any of the frustums. In or near the shutter plane samples will be closely spaced within the frustums, but then there will be a jump in the rhombus space where the distance between samples is large. What this shows is that the distance between samples in or near the shutter plane in the pre-scaled space will not decrease if the 2D anti-aliasing method described above is used.

In order to reduce sample spacing near the shutter plane one may sample for additional virtual slit positions with a smaller slit spacing and then take an average or weighted average. One example may be to take samples both at the slit center and the slit intersections and give the center sample a weighting of 0.5 and the intersection samples a weighting of 0.25. One may also apply a low pass filter prior to the rendering step. Such a filter may have a different low pass frequency depending on the z-value. The wave length of this frequency may be related to the distance was defined in Equation 10. If this filter is applied after the transformation step it is important that the frequency is adjusted for the transformation.

Figure 17:
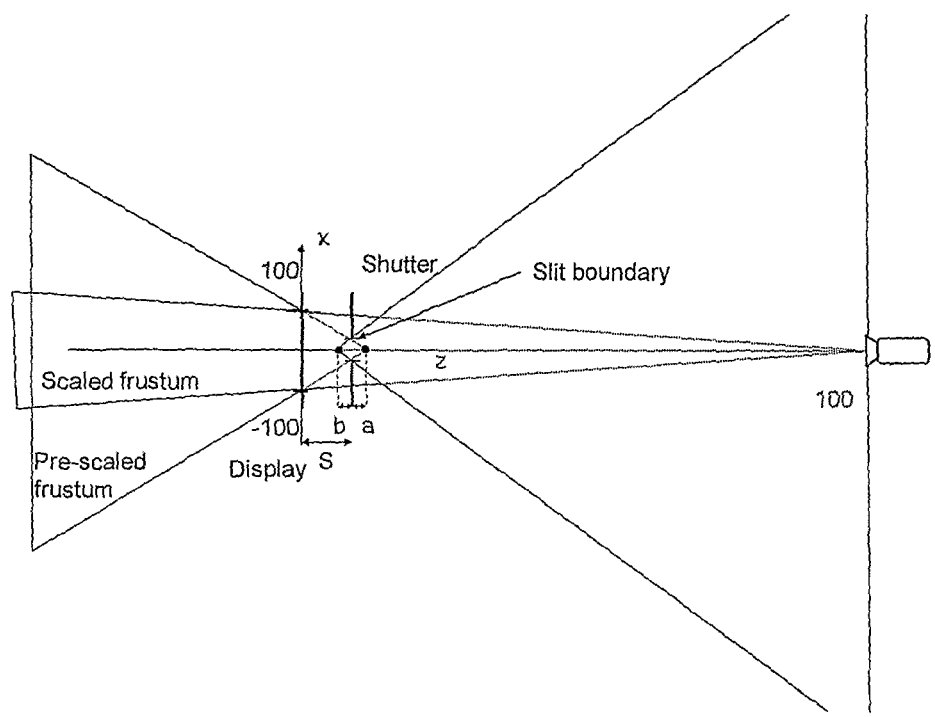
FIG. 17 shows frustums for two different functions either side of the shutter plane

Another way to reduce the distance between samples near the shutter plane is to have two different scaling functions either side of the shutter plane. One example would be to have two versions of Equation 11, where S is replaced with (S+a) for $z_0<S$ and S replaced with (S−b) for $z_0>S$. In this example a and b are constants that may be given any value, positive or negative. For $z_0=S$ one may define a special case or one may choose to use one of the two equations. a and b may be set such that pixel frustums are equally spaced in the shutter plane. FIG. 17 shows one example. In this example a is determined by the intersection between lines from the end of the frustum in the display plane through the slit boundaries in the shutter plane. b is determined by the intersection between lines from the end of the line of observation through the slit boundaries. Equal triangles for this example gives:

$$a = \frac{S\Delta e}{T - \Delta e}; \quad b = \frac{(D-S)\Delta e}{W - \Delta e} \quad \text{Equation 12}$$

where T=frustum width in the display plane, W=width of the line of observation, Δe=shutter slit width, S=shutter and display separation, D=display and line of observation separation.

Another method would be to define a lookup table rather than a function. The table would define the scaling as a function of z. This could be split into one table defining the x-dependent scaling and one table defining the e-dependent scaling as defined in Equation 11. It could be made to trace the standard curve until the area where parts of the scene are not captured. In this area the shift can be reduced. The table may also trace one of the other scaling functions described above.

Minimum Tessellation

Figure 20:
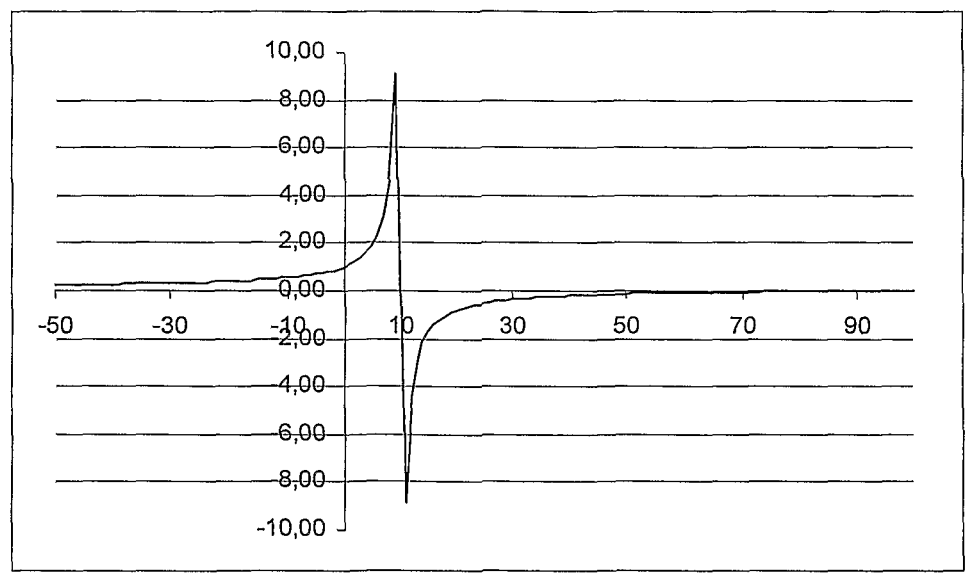
FIG. 20 shows how a line is scaled using the general rendering method

One of the challenges with the GRM is that graphics cards tend to make extensive use of linear interpolation. For a triangle with constant z for all points on the triangle this is not a problem since the scaling and shift factor in the equation above are linear. Such a triangle has a normal that is parallel to the normal of the shutter. For a triangle with the vertices at different z values linear interpolation will give rise to errors. FIG. 20 shows what a straight horizontal line in the pre-scaled space will look like in the scaled space. If a triangle had an end point with z=−30 and one with z=30 a linear interpolation would give a straight line with x-values going from 0.33 to −0.35. However, the correct curve is highly non-linear with asymptotes around z=10. One way to overcome this problem is to divide the triangle into several smaller triangles. This is referred to as tessellation. This effectively improves the sampling frequency of the GRM.

FIG. 18 can be thought of as representing the frustums for adjacent pixels in the pre-scaled space. A triangle based within only one of these frustums will only be captured by one pixel in the scaled space. If a large triangle is tessellated such that at least one of the new triangles is based within only one frustum then one can ensure that the vertices of that triangle are scaled correctly. From the image below one can see that this minimum triangle size is highly dependent on z and x positions of the vertices. It is possible to create a general rule that ensures that sufficient tessellation is performed. Such a scheme may tessellate into triangles smaller in the x-direction and y-direction the closer the z-values are to the z-value of the shutter plane (S). It would also tessellate into smaller triangles in the z-direction the higher the x-value. FIG. 18 only shows the frustums for one slit position. One may wish to perform the tessellation on the entire scene for all slit positions. In that case the tessellation in the z-direction may take account for the worst case x-values since the move to a new slit position is equivalent to shifting the x-axis. Instead it will be the maximum allowed viewing angle that will determine the tessellation in the z-direction.

GRM Substituting Shutter Plane with Display Plane

As an alternative one may choose to transform the scene such that all perspectives for one display pixel or pixel column can be captured through a standard perspective rendering operation. This transformation may use the normal GRM transformation described in Equation 11 provided that the shutter is treated as the display and the display is treated as the shutter both for the transformation and the standard projection operation. The output for one perspective render will be all the pixel values for all shutter slit positions for a single pixel column. This output can subsequently be read into memory in such a way that the full frames for particular shutter positions are assembled. In a base case lines are sampled going through the center of the pixel and through the center of each shutter slit. This sampling is identical to the base case for the normal GRM sampling. However, the introduction of 2D anti-aliasing in the scaled space will have a different effect. In this case the additional samples will be taken through additional lines all going through the centers of the pixels, rather than the shutter slits. The rhombus shape will appear near the display plane rather than the shutter plane. The same improvement methods may be used for this GRM variation as in the standard GRM, e.g. assuming additional virtual pixel positions.

Warping Implementation for Volumetric Data

Volumetric data is based on points in space, voxels, rather than polygons. A common way to represent these points is through a number of parallel planes, each of which has a texture representing all the voxels in the plane.

Equation 11 describes the shift for the x-coordinate, from $x_0$ to $x_1$, of a particular point using GRM, when a camera shifts by e. For a constant $z_0$ the equation can be split into two components, first a linear scaling factor of the x-coordinate and a shift independent of the x-coordinate. By doing so one will note that the scaling factor is independent of e, which means that the scaling can be performed once for all camera positions. Both the scaling factor and the shift are dependent on the z-coordinate.

Based on this observation one may construct the following implementation for rendering of volumetric data:
 1. Make a representation of the scene where the normals of the texture planes are parallel to the normal of the shutter plane, i.e. z is constant in the texture plane 2. Choose a first camera position for a particular slit position
3. Stretch the texture planes in the x-direction with the factor from the equation above by inserting the z-coordinate and setting e=0. Note that for $z_0>S$ the stretching will change sign, which effectively constitutes a flip of the texture.
4. Make a standard projection of the scene based on the frustum coordinates for the chosen slit position
5. Choose a new slit position and the corresponding camera position
6. Shift the texture planes in the x direction by inserting the correct camera shift e for the new camera position compared with the original position. The shift is given by Equation 11. This shift will be different for each texture plane since it is dependent on the z-value.
7. Repeat step 4-6 until all slit positions have been rendered.

For anti-aliasing purposes one may apply a low pass filter for each texture plane between step 1 and 2 above. This may be done with different filters depending on the z-coordinate. The minimum feature size or the wavelength of the low pass filter may be set to match w, the width swept by a 3D pixel, described by Equation 10 for a given z-value. Other alternatives and methods are described later in this document.

Due to precision problems for very large stretching factors a special case may be required for texture planes in or near the shutter plane. One way to do this would be to do the stretching after the shift for these planes. Another way would be to use different equations for stretching on either side of the shutter plane. Yet another way would be to use a look-up table rather than the normal scaling and shifting equation as described above. Such a look-up table may put a cap on the scale and shift factor. These alternatives were described in more detail in a previous section.

Prior to the stretching one may also determine which parts, if any, of the texture planes that will not be seen in any of the slit positions and remove those parts.

The above method is not limited to the case where voxels are represented by texture planes. For a particular viewing angle voxels could first be stretched and/or shifted individually or as a group and then shifted as a group for a particular depth for each new slit camera position.

One way to improve performance and quality may be to pre-calculate planes for a number of viewing angles. In between those angles it may in some instances be sufficient to perform an approximation of the non-linear z-dependent transformations.

2. Multiple Perspectives

Figure 21:
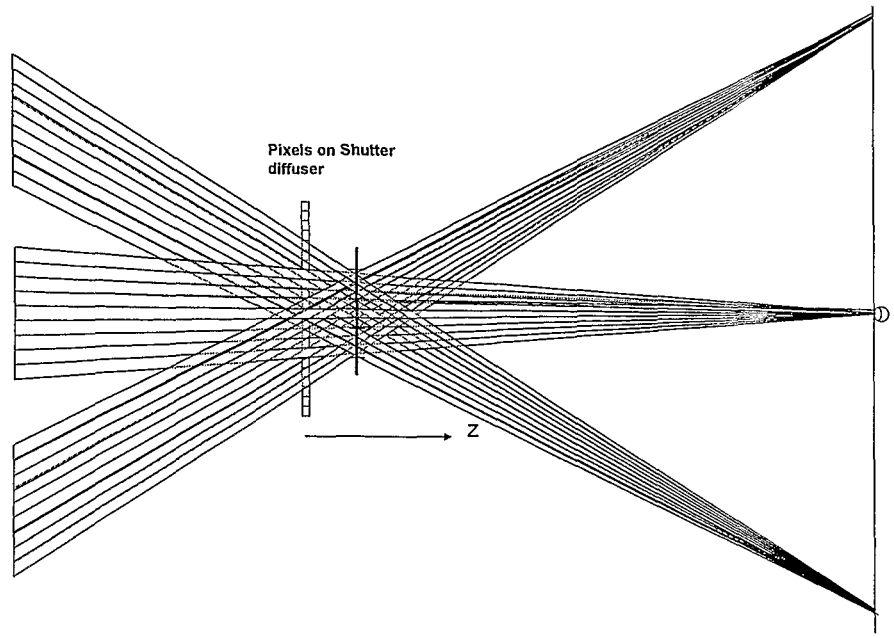
FIG. 21 shows a known rendering method

FIG. 21 is an example of a known rendering method. It is an example of a 3-view (3 independent viewing positions as defined below) system where the shutter slits are three times the width of the pixel pitch. For each shutter position three perspectives are rendered. They are taken from positions so that three frustums are generated that are non-overlapping in the display/diffuser plane. They are also taken such that frustums span a shutter slit in the shutter plane. They may also be taken such that the same camera can be used for a particular perspective for all slits. Typically it is described such that views are generated in a manner such that one records what would be seen in the real/virtual world through that slit.

Figure 22:
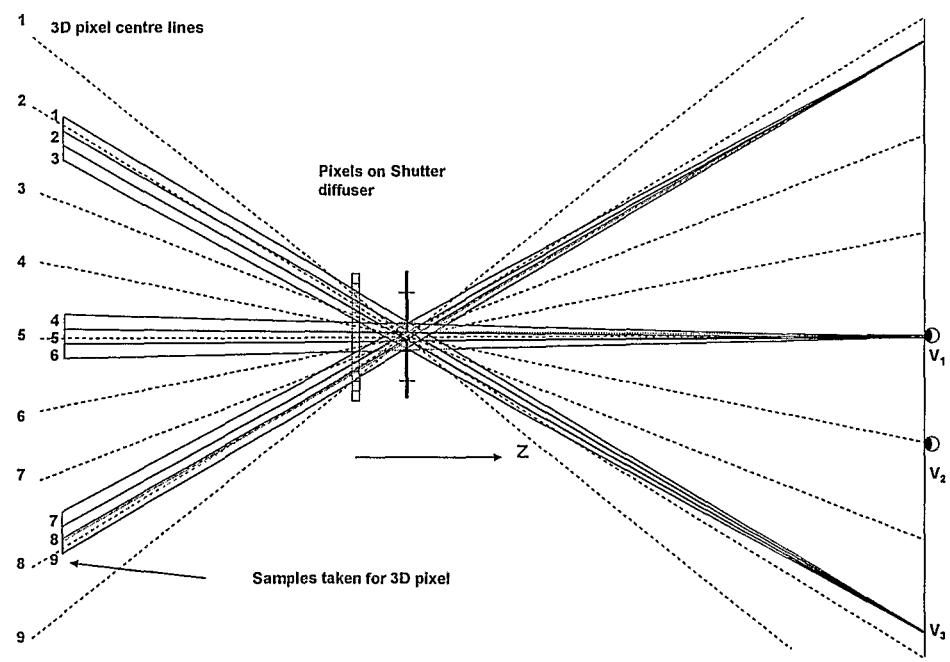
FIG. 22 shows a known rendering method compared to 3D pixel center lines
Figure 23:
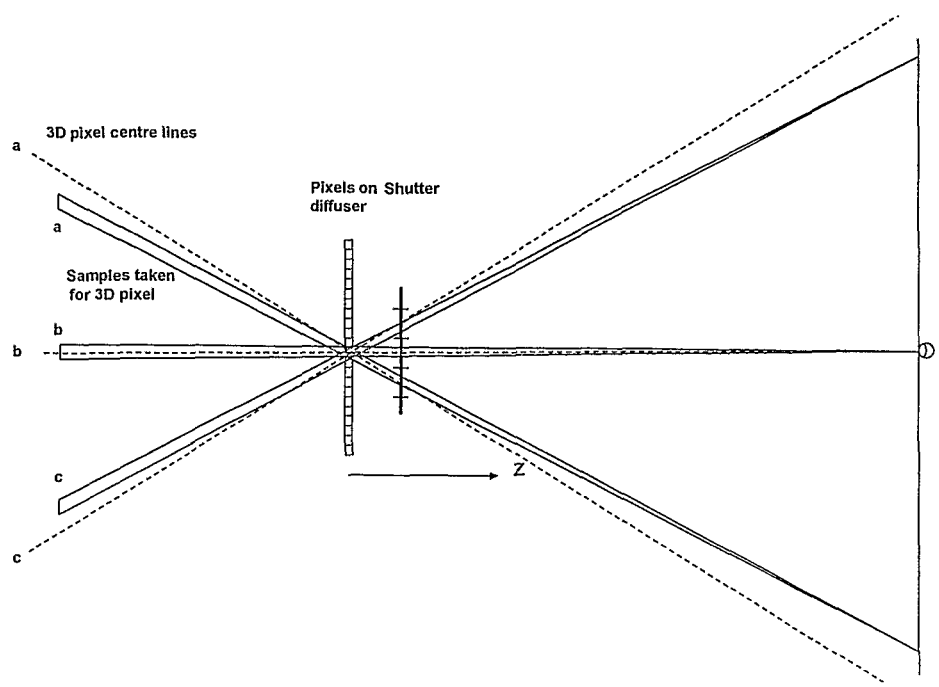
FIG. 23 shows a known rendering method compared to 3D pixel center lines

With this method the samples are unevenly distributed compared with the 3D pixel center lines described FIG. 11. This means that from some viewer positions the image may have low errors while from other positions the error may be large. As mentioned previously one may wish to have samples as evenly distributed as possible when there is no information on the exact eye position of the viewer. In the description for FIG. 11 it was stated that the 3D pixel center lines could either be viewed as groups of center lines going through the center of the 2D pixels or groups of center lines going through the center of the shutter slits. FIG. 22 compares the samples taken using the known method with a group of center lines for a particular shutter slit, while FIG. 23 compares the samples with a group of center lines for a particular display pixel. The numbers and letters indicate which samples relate to which 3D pixel center line. In FIG. 23 the distance between the samples taken and the center lines is relatively small and relatively uniform for different 3D pixels. In FIG. 22 the situation is different. In this case the distance between the center line and sample is very small for some 3D pixels, e.g. 3D pixel 5, while for others it is much larger, e.g. 3D pixel 3 and 4. Also for 3D pixel 4 the sample is taken with anti-clockwise rotation from the center line while for 3D pixel 3 it is taken with clockwise rotation. One may express this as the angular spacing between samples being uneven. Hence, the worst case sample spacing is worse than if the samples were uniformly distributed. This may lead to poorer representation of a range of high image frequency elements in the original scene.

The result of the non-uniform distance from the center lines is that from the intersection of the center line of 3D pixel 5 and the line of observation, eye position $V_1$, the error is relatively small. Indeed the three pixels that are visible from this position (4, 5 and 6) were rendered taking samples from this viewing position, i.e. they represent the perspective that the viewer should see from this position. In contrast, when viewing from the intersection of the-center line of 3D pixel 4 and the line of observation, eye position $V_2$, the error is relatively large. Here the pixels that are visible are rendered taking samples from eye positions $V_1$ and $V_3$ and not from $V_2$ where they are viewed.

The above findings are reflected in the visual appearance for this rendering method. The difference in jumps between perspectives is more or less the same, but discontinuities within an image for a specific slit are marked. However, in order to improve the image quality the number of samples taken may be increased.

Known methods assume that the number of perspective positions used for rendering the image equal the number of independent viewing positions. For clarity these two terms will be defined as follows:

The number of perspective positions is here defined as the number of positions on the line or plane of observation from which one or more pixels are rendered for a particular shutter slit or aperture, i.e. the number of positions used for recording the image.

The number of independent viewing positions is here defined as the maximum number of positions where a viewer may be presented with a full image that does not contain information from any of the other independent viewing positions. These may be the positions described in FIG. 3. It should be noted that this definition assumes perfect properties of the system components. In a real system there may for example be information from other viewing positions due to the fact that the shutter cannot block light completely. In many instances the number of independent viewing positions will equal the number of unique frames that the display can provide. This may also be the number of slits through which a pixel may take a unique value. In a lenticular display system it may be the number of pixels behind each lens that represent different views.

Because the perspective positions may be somewhat arbitrary one may improve quality by generating the image from perspectives or samples taken from more perspective positions than there are independent viewing positions. In a first instance of the invention a method is used where the number of perspective positions for a given shutter slit or display pixel equal the number 3D pixels for a given shutter slit or display pixel. In that case only one perspective or sample will be taken for each 3D pixel. In a second instance of the invention more than one perspective or sample may be taken for each 3D pixel and the 3D pixel may be given an average or weighted average of those perspectives or samples. In a further aspect of the invention the perspectives or samples are evenly distributed in the shutter plane or evenly distributed in the display plane or evenly distributed in both of these planes. One purpose of increasing the number of perspectives or samples is to reduce image artefacts, some of which may be referred to as 3D aliasing effects.

Figure 24:
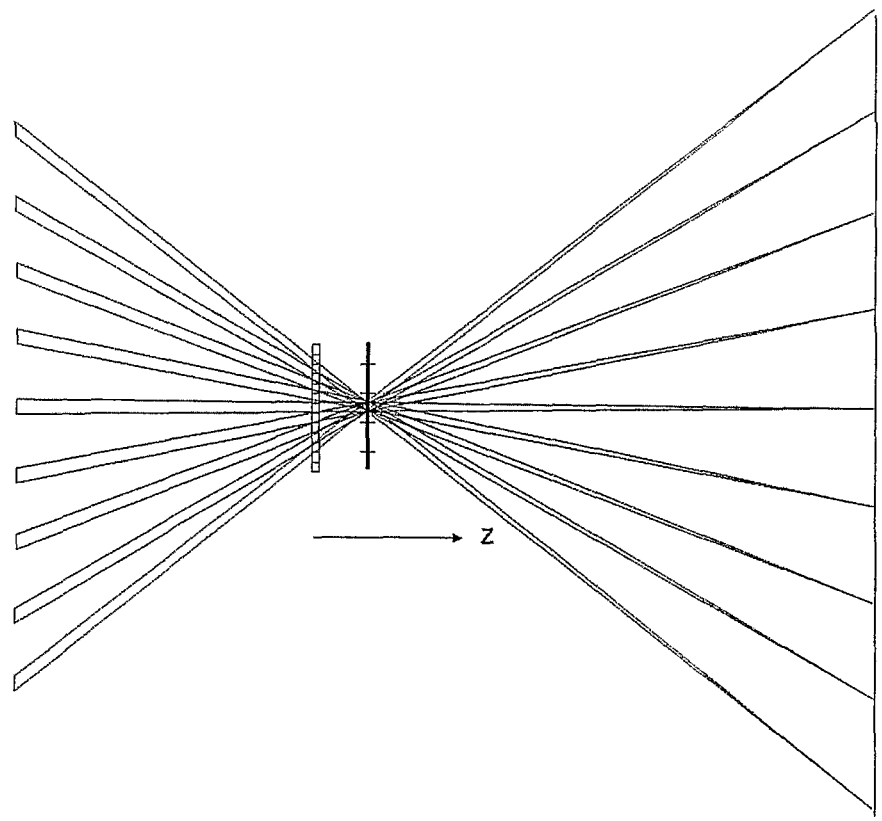
FIG. 24 shows a rendering method assuming a narrower slit

One rendering scheme provides more perspective positions by assuming a narrower shutter slit than the actual shutter slit, and then implementing a multiple perspective method, as shown in FIG. 24. In this example nine perspective positions, one for each pixel within a sub-slice behind the shutter slit, are used compared to only three in the previously described known method. The sublice may be a portion of screen available for display of images for an open slit. The display may still only provide three independent viewing positions. The bandwidth remains the same but the perspectives or samples are more uniformly distributed and with more uniform separation from the center lines of the 3D display pixels. It should be noted that for one special case where one and only one full pixel may be seen through an open slit this method and the known method will be the same. Even in this special case one may however benefit from taking perspectives or samples from additional perspective positions in-between the positions shown in FIG. 24.

If one takes one perspective per pixel and assume that the scene is sampled along a line, using ray tracing, with no 2D anti-aliasing the method will be mathematically the same as the standard GRM method with the same assumptions. 2D anti-aliasing will have different effect on the two methods however. As described above, 2D anti-aliasing in the scaled space for GRM provided additional intermediate sample lines going through the same point in the shutter plane as the original sampling lines. For this method 2D anti-aliasing would give additional sampling within the same narrow pixel frustum shown in FIG. 24, i.e. it does not increase the number of perspective samples since they are taken from the same camera position.

Figure 25:
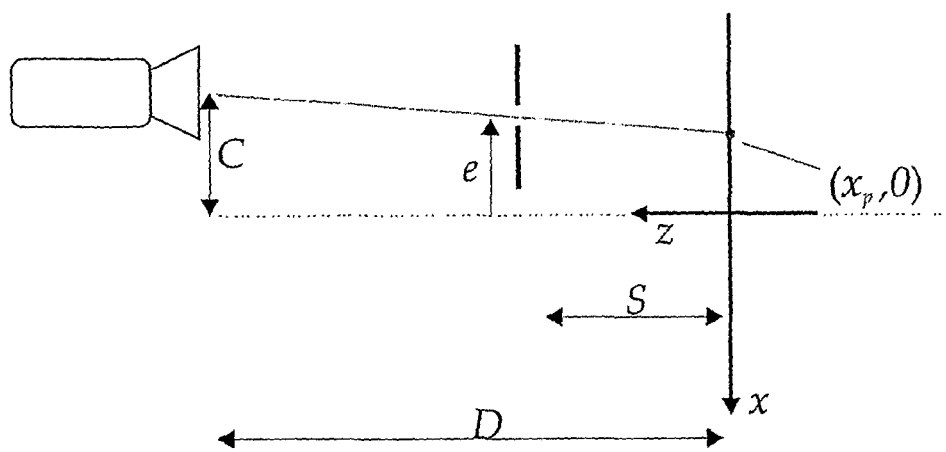
FIG. 25 shows how the camera position depends on the projected point

Assuming that the camera is positioned such that the center line of the projection goes through the center of the slit and the center of the pixel one may determine the camera positions as shown in FIG. 25. Once a slit position is set by the slit spacing e, and a camera position is fixed the projected point $x_p$ is given. This means any point in the scene that lies on the line from the camera to the slit position will be projected to the point $x_p$. Using equal triangles it can be shown that the point $x_p$ is given by:

$$x_p = \frac{CS - eD}{S - D}$$

Figure 26:
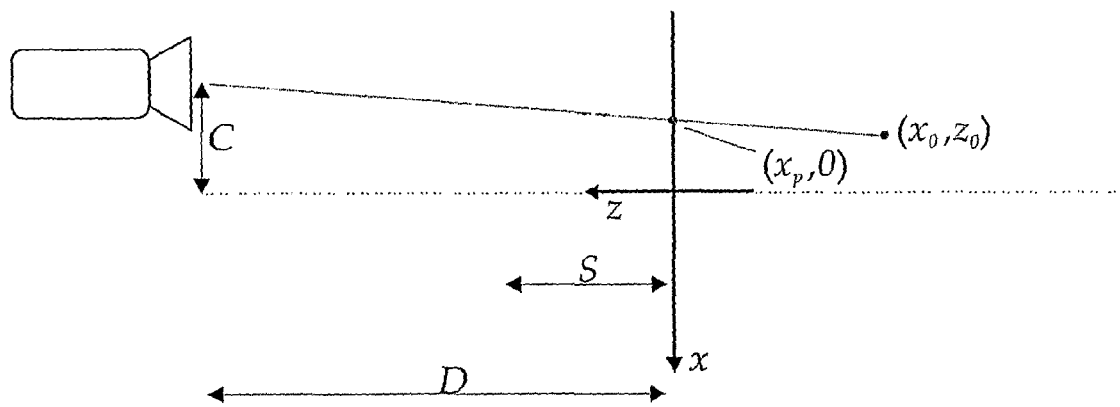
FIG. 26 shows how the camera position depends on the projected point

For a point located at $(x_0, z_0)$ as indicated in FIG. 26 the projected point $x_r$ for a camera a positioned at (C,D) will be given by:

$$x_p = \frac{Dx_0 - DC}{D - z_0} + C$$

Combining these two equations and rearranging yields:

$$C = \frac{e(D - z_0) + x_0(S - D)}{S - z_0} \qquad \text{Equation 13}$$

These equations determine where a camera should be located to correctly capture the point $(x_0, z_0)$ to achieve the correct perspective for that slit in that direction. Therefore to capture a fan of "rays" through the slit the camera must be moved according to the equation for C. In reality this is an infinite number of locations since a small change in either x or z gives a new location for C. However, in a quantized system, like a computer screen, there are finite locations. Say for example that 200 pixels where visible through/behind the slit. In this case 200 different C-values may be computed, since 200 $x_r$ values exist. This is the case where the number of perspective positions for a given shutter slit equal the number 3D pixels for that shutter slit. One may take more samples by using a higher number of values and then perform an averaging or weighted averaging operation, thereby taking more than one perspective or sample for each 3D pixel. One example would be to define additional values mid way in-between each 2D pixel.

Like the GRM the above method has the same blind rhombus shape in the shutter plane and may benefit from additional samples taken along lines or frustums going through other parts than the center of the shutter slit or the center of the display pixel. This can be achieved through having more virtual shutter positions than there are actual shutter positions. This becomes a method in which more than one sample or perspective is taken for the same 3D pixel and the 3D pixel is given a value based on an average or weighted average of these.

Figure 27:
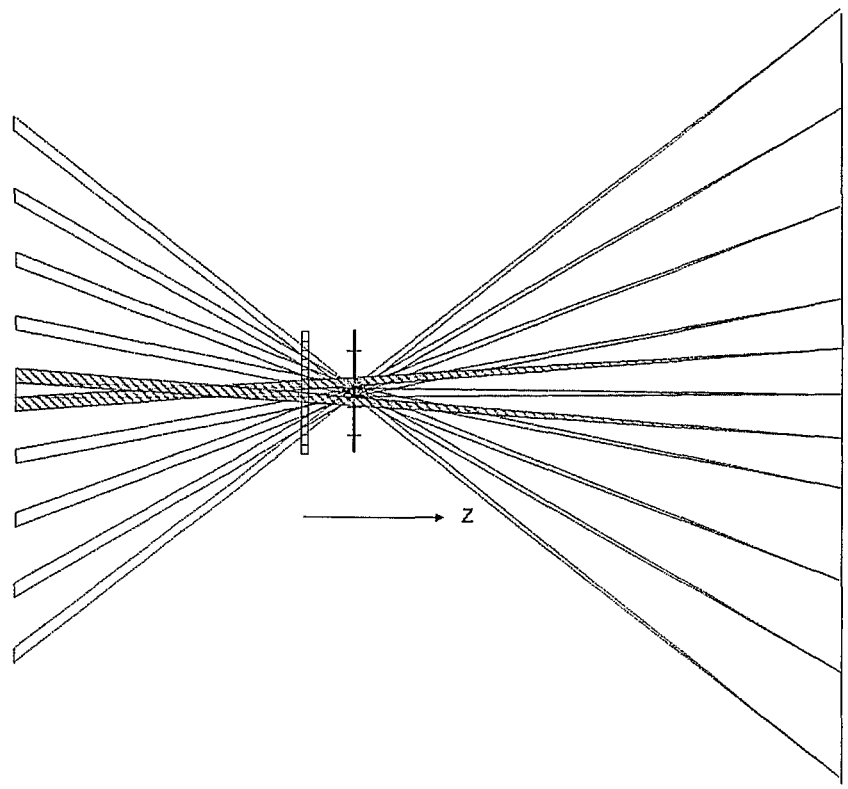
FIG. 27 shows the depth of field method

One way to render for additional virtual slit positions is to use a depth of field method. In relation to a lens, depth of field is the relationship between and the distance of an object point from the lens' plane of focus and the sharpness of that image on the lens' focal plane. The image of such a point is called a circle of confusion. Depth of field is regulated by the effective diameter of the lens, or more specifically the numerical aperture. The depth of field method in computer graphics will in effect take the average of a number of different perspectives where one plane will remain unchanged. If one chooses this plane to be the pixel plane this will be equivalent to taking additional samples for other virtual slit positions. FIG. 27 shows two such depth of field perspectives for the center perspective. By making the camera move by a sufficient distance along the line of observation one may sample in the space that otherwise gives rise to the rhombus shape. n one aspect of the present invention this distance may be such that the frustum moves up to half the width of a shutter slit in the shutter plane. In another aspect the distance is chosen so that the camera positions are evenly spaced in the line of observation.

The depth of field method may also provide additional samples in the vertical direction as well as the horizontal direction. It has been shown through experiments that this vertical smoothing may in some instance improve the visual appearance of the scene. The depth of field method is only one example of how this vertical smoothing can be achieved. Any method providing additional samples that are then combined through an average or weighted average operation may be used. Other smoothing operations may also be used. What one may aim to achieve is to implement a method which is the equivalent of Equation 8 sampling light rays that have equal spacing both in the shutter plane and the display plane.

Figure 28:
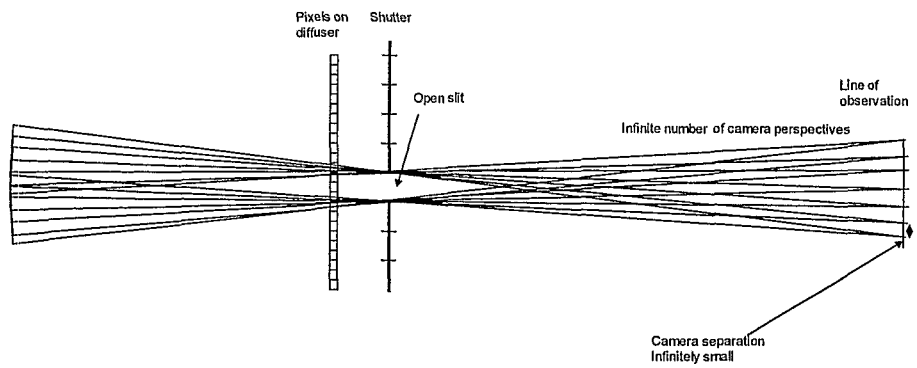
FIG. 28 shows a multiple perspective method.

Another way to achieve this result is to render images of what is seen through an open slit as described in FIG. 21, but with several additional camera positions. A number of extra perspectives are taken and the pixels are given an average or weighted average of those perspectives. FIG. 28 describes such a method. With camera perspectives going to infinity the method would be equal to using the display in reverse to act as a camera.

Implementation for Ray Casting of Volumetric Data

Ray casting is a common method for displaying volumetric data. Ray casting may also be used for data other than volumetric data too, i.e. surface models. It is based on sending rays from the eye through the scene in a similar way as ray tracing. The following method is also valid for ray tracing applications. In computer graphics ray casting means sending one or more rays from a virtual camera through each pixel in the image plane and adding colour contributions along the rays. The below example is based on a horizontal parallax system, but can be extended to both horizontal and vertical parallax.

Using the multiple perspectives analogy it is possible to generate images for a 3D display by tracing rays from the calculated camera positions. For a given multiple perspectives image as sent to the 3D display, the calculated camera positions are calculated for each pixel in the image. The calculated camera for a given pixel in the multiple perspectives image is found based on the slit that pixel is to be seen through. Rays are traced from the pixel center, through the horizontal center of the slit and to the defined view line. Where the ray intersects the view line is the calculated camera position for that pixel viewed from the current slit according to Equation 13. The basic algorithm may look as follows:
1. Have the volumetric data stored in a 3D data structure/texture which makes it possible to look up any voxel value through a simple read operation.
2. Generate a lookup table/texture which stores the calculated camera positions for all columns of pixels in the output frames (assuming that slits are column based).
3. Send rays from the calculated camera position through the corresponding pixel in the image plane—adding contribution from the volume while iterating. The final result is stored in the corresponding pixel location. Different composition methods could be used, e.g. Maximum Intensity Projection (MIP), MultiPlanar Reconstruction (MPR), Over operator, Under operator, etc.

The method does not put any restrictions on blending method, ray increments through the scene or optimization methods like empty space leaping or early ray termination while rendering a high quality view for the 3D display due to the per pixel/subpixel mapping. To increase visual quality jittering of the rays could also be performed as a supersampling/antialiasing technique. Other methods outlined in this document may also be used. For example both pixels and shutter slits may be divided into subpixels.

Another method of ray casting a volume using the multiple perspectives analogy is by iterating through the volume using view aligned slices. These view aligned slices do not have to be uniformly spaced. Since texture lookup is such a resource demanding action on modern graphics hardware, the idea is to reduce the texture lookups by iterating through the volume data only once in a slice by slice manner instead of iterating through the volume for each frame sent to the 3D display. For each slice the corresponding volume data for that slice is transformed to the correct location in all of the other 3D display frames.

1. Have the volumetric data stored in a 3D data structure/texture which makes it possible to look up any voxel value through a simple read operation.
2. Ray cast the central view from front to back by iterating in view aligned slices through the volume. I.e. z is constant in the sampling plane.
3. For each view aligned slice interpolate out to the multiple perspective frames.

Additional Perspectives or Samples Through Interpolation

It has been described that many perspective positions or samples may improve image quality. Typically there is a computational cost attached to increasing the number of perspective positions. The way existing graphics processing units (GPU) work this means that the full geometry of the 3D scene needs to be processed for each perspective position making it difficult to achieve real-time performance.

One way to overcome this is to first generate one or more full perspectives, original perspectives, along with associated depth maps. The depth maps describe where in the z-direction each pixel is positioned. The depth map can be translated into a disparity map which describes how the pixel would move based on a pre-defined camera movement. Through image interpolation new perspectives can be generated.

One method that can be used to interpolate views at other positions than the original camera positions is described below.

The main input to the interpolation function is one image and the corresponding depth map or more than one image and the corresponding depth or disparity maps. A depth map tells the depth of each pixel in the image, a disparity map tells how two pixels differs in two images (assumed that the images are captured on the same motive, with an arbitrary camera separation).

The interpolated view is calculated as follows $$T = V \cdot \frac{1}{z_i} \cdot P \cdot P_{mod_i} \cdot \left( V \cdot \frac{1}{z_r} \cdot P \cdot P_{mod_r} \right)^{-1}$$

where $$V = \begin{bmatrix} \frac{W}{2} & 0 & 0 & \frac{W}{2} \\ 0 & \frac{H}{2} & 0 & \frac{H}{2} \\ 0 & 0 & \frac{1}{2} & \frac{1}{2} \\ 0 & 0 & 0 & 1 \end{bmatrix}, \quad P = \begin{bmatrix} \frac{2n}{w} & 0 & 0 & 0 \\ 0 & \frac{2n}{h} & 0 & 0 \\ 0 & 0 & -\frac{f+n}{f-n} & \frac{2fn}{f-n} \\ 0 & 0 & -1 & 0 \end{bmatrix},$$

$$P_{mod_i} = \begin{bmatrix} 1 & 0 & -\frac{e_i}{D} & -e_i \\ 0 & 1 & 0 & 0 \\ 0 & 0 & 1 & 0 \\ 0 & 0 & 0 & 1 \end{bmatrix}, \quad P_{mod_r} = \begin{bmatrix} 1 & 0 & -\frac{e_r}{D} & -e_r \\ 0 & 1 & 0 & 0 \\ 0 & 0 & 1 & 0 \\ 0 & 0 & 0 & 1 \end{bmatrix}$$

-continued $$\begin{cases} V = \text{viewport matrix} \\ W = \text{width of viewport in pixels} \\ H = \text{height of viewport in pixels} \\ P = \text{projection matrix} \\ n = \text{near plane distance} \\ f = \text{far plane distance} \\ w = \text{distance between left and right clip planes} \\ h = \text{distance between bottom and top clip planes} \\ D = \text{focal plane distance} \\ P_{mod_i} = \text{translation and shearing matrix of interpolated view} \\ P_{mod_r} = \text{translation and shearing matrix of original view} \\ e_i = \text{distance from central view to interpolated view} \\ e_r = \text{distance from central view to original view} \end{cases}$$

$$\Rightarrow T = V \cdot P \cdot P_{mod_i} \cdot (V \cdot P \cdot P_{mod_r})^{-1}$$

$$= \begin{bmatrix} 1 & 0 & \frac{W(f-n)}{wf}(e_i - e_r) & -\frac{W(D-n)}{wD}(e_i - e_r) \\ 0 & 1 & 0 & 0 \\ 0 & 0 & 1 & 0 \\ 0 & 0 & 0 & 1 \end{bmatrix}$$

The interpolated pixel position, $x_{i,pix}$, is then calculated as $$x_{i,pix} = x_{r,pix} + \frac{W(f-n)}{wf}(e_i - e_r) \cdot z - \frac{W(D-n)}{wD}(e_i - e_r)$$

where $x_{r,pix}$ is the position of the pixel in the original image and z is the depth of the pixel. The original image is in other words read synchronously, one pixel at a time and the pixels are written to the position in the interpolated image as calculated above.

The quality of the interpolated image decreases as $|x_r-x_i|$, the distance from the original to the wanted view, increases. One problem with this interpolation method is that empty surfaces can occur, especially at positions where the depth varies much between adjacent pixels. To create many perspectives from wide angles, more than one input image may be used. The information from these images can be combined in different ways to create a better interpolation.

Figure 29:
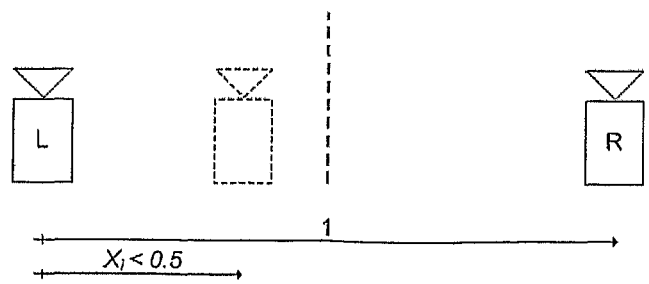
FIG. 29 shows a camera view being interpolated between two original cameras.

FIG. 29 shows a camera setup with two input images. If a third view at position $x_i<0.5$ is wanted, one way to combine the information from the two input images is to first calculate the view from image R and store the result into a buffer and then calculate the view from image L and store the result into the same buffer. Since L should be the dominating image, $|x_i-x_L|<|x_i-x_R|$ when $x_i<0.5$, the interpolated image will basically consist of information from image L, but with gaps filled with information from image R. This may increase the image quality drastically but still not give a perfect result.

One way to further enhance the interpolation quality is to consider a number of surrounding pixels in the output image. If the pixels have not been written earlier, write the current pixel to these positions but do not mark the pixels as written. This will cause some extra writing but small gaps will be filled with the nearest pixel value.

This is only one example of interpolation methods that may be used. Interpolation may be used to produce the multiple perspective operations mentioned above or it may use additional transformation steps to produce images according to GRM.

In some instances it may be possible to improve performance if not all pixel values are calculated for all camera positions. An analogy can be made to the ray casting method described above. If a full frame with all pixels was to be created through interpolation for each calculated camera position (the position where a line between the center of a pixel, the horizontal center of a slit intersects the viewing line) many pixels would be rendered that are never displayed. One may therefore create a scheme where only those pixels for a given camera position are calculated that will be shown on the 3D display. Another way to achieve the same thing is that one selects the relevant camera position for a given pixel in an output frame to the 3D display, and interpolate the pixel value based on this camera position. These methods may also be used when pixels are divided into sub-pixels as described in other parts of this document.

The original images may be produced using a depth of field or other pre-filtering technique. Thereby one may limit the frequency elements at different depths prior to creating the multiple perspectives. In one aspect of the invention this pre-filtering is related to the width of the 3D pixel as defined by w in Equation 10, or a multiple thereof. This width may be seen as the maximum wavelength allowed for the image frequency at a given depth.

There could be an instruction offered to applications that allows the depth properties of the display to change from frame to frame. For example, the display may reduce bit depth and increase the number of displayed perspectives in a scene where additional depth is required. If the perspectives are rendered by interpolation the same output can be produced by the application and/or graphics driver, while the number of perspectives generated is changed. In the case where the image bit depth is reduced the speed of interpolation may be similar between different settings, because additional perspectives are compensated by fewer colour bits.

Changing Feature Size and Image Frequency of the Scene

The above methods assume that the scene is given and aim to optimise the perceived image quality for the viewer based on that. In virtual 3D scenes one may be able to adapt the scene in a way that image artefacts for a given 3D display and rendering method may be reduced.

One way is to ensure that the minimum feature size is appropriate for a given depth in the scene. In one aspect of the invention this feature size should be related to the width w defined in Equation 10. The minimum feature size could equal w or a w multiplied with a constant factor. The advantage of setting such a minimum feature size is that one may avoid certain features not being visible from certain observation positions, one may also reduce the relative image error. In other words, the error in the image may be smaller in relation to the size of a feature if the feature is bigger. For example, if the edge of a line is jagged, this jaggedness may be smaller in relation to the width of the line if the line is wider.

Sometimes feature size may not be a meaningful term and one may instead limit the maximum frequency element in the scene. In this case the wave length of the maximum frequency may be related to the width w defined in Equation 10 in a similar way as the minimum feature size.

Standard methods used in computer graphics may be used to ensure a minimum feature size. Examples of such methods are level of detail and MIP maps. In level of detail the complexity of a 3D object and hence the minimum feature size may be changed depending on the position of the object. MIP maps are pre-calculated versions of a texture with different levels of detail or image frequency.

The minimum feature size only relates to the spatial sampling rate at a given depth. A 3D display also has a limited angular sampling rate for a given depth. The scene may also be pre-filtered to reduce the angular frequency or angular level of detail of an object.

The invention claimed is:

1. A method of creating image data, the image data being suitable for use with an autostereoscopic display comprising a two dimensional display and a switchable aperture array, the method comprising:
generating a model including a model of a display plane modeling the two dimensional display of the autostereoscopic display and a model of an aperture plane modeling the switchable aperture array of the autostereoscopic display,
taking a plurality of samples of a three dimensional scene using the display plane modeling the two dimensional display of the auto stereoscopic display and the aperture plane modeling the switchable aperture array of the autostereoscopic display,
each sample of the plurality of samples of the three dimensional scene being taken for a combination of a pixel on a two dimensional display of the modeled autostereoscopic display and an aperture of the modeled autostereoscopic display, including first samples and second samples wherein according to the modeling for the first samples of the three dimensional scene samples are taken for a combination of each of a plurality of pixels of the modeled autosteroscopic display and a particular aperture of the modeled auto stereoscopic display along respective first lines which pass through substantially the same point of the aperture of the modeled autostereoscopic display, and wherein for the second samples of the modeled autostereoscopic display samples are taken for a combination of a particular pixel of the modeled autosteroscopic display and each of a plurality of apertures of the modeled autostereoscopic display along respective second lines which pass through substantially the same point of the pixel of the modeled autostereoscopic display.

2. A method as claimed in claim 1, wherein the center line of projection for all samples substantially pass through a viewing line.

3. A method of creating image data, the image data suitable for use with an autostereoscopic display, the autostereoscopic display including an aperture plane and a display plane, the method comprising:
generating a model including a model of a display plane modeling the two dimensional display of the autostereoscopic display and a model of an aperture plane modeling the switchable aperture array of the auto stereoscopic display,
taking a plurality of samples of a three dimensional scene, each sample taken for the combination of a pixel on a two dimensional display and an aperture located in an aperture plane of the auto stereoscopic display, wherein the center line of projection between the pixel and the aperture for all samples for a particular aperture located in the aperture plane pass through substantially the same point of the aperture.

4. A method as claimed in claim 3, wherein the center line of projection for all samples for a particular pixel pass through substantially the same point of the pixel.

5. A method as claimed in claim 3, wherein the plurality of samples are substantially evenly distributed.

6. A method as claimed in claim 3, wherein the plurality of samples for a particular aperture are substantially evenly distributed in at least one of: the display plane and the viewing plane.

7. A method as claimed in claim 3, wherein the plurality of samples for a particular pixel are substantially evenly distributed in at least one of: the shutter plane and the viewing plane.

8. A method as claimed in claim 3, wherein the plurality of samples are obtained by assuming an aperture width that is narrower than a physical aperture width.

9. A method as claimed in claim 3, wherein each sample comprises a center sample, each center sample taken along the center line of projection.

10. A method as claimed in claim 3, wherein each sample comprises an average of a plurality of off center samples, where the off center samples are distributed around the center line of projection.

11. A method as claimed in claim 3, wherein each sample comprises an average of a center sample and a plurality of off-center samples, wherein each center sample is taken along the center line of projection, and the off-center samples are distributed around the center line of projection.

12. A method as claimed in claim 10, wherein each off-center sample is offset from the center line of projection in at least one of a vertical distance and a horizontal distance.

13. A method as claimed in claim 10, wherein the off-center samples are evenly distributed around the center line of projection.

14. A method as claimed in claim 10, wherein the off-center samples are distributed by stochastic jittering.

15. A method as claimed in claim 10, wherein the average is a weighted average.

16. A method as claimed in claim 3, the method further comprising:
generating at least one full perspective image and an associated depth map, the depth map defining a z-direction for each pixel of the full perspective image;
determining how pixels would be translated for a predefined perspective change using the depth map; and
using image interpolation to create a new perspective from which at least one of the plurality of samples can be taken.

17. A method as claimed in claim 3, the method further comprising:
calculating a first perspective view of the 3D scene from a first position,
calculating a second perspective view of the 3D scene from a second position,
interpolating a third perspective view of the 3D scene from a third position, the third position being closer to the first position than the second position, the interpolation comprising:
transforming the second perspective view to correspond to a view from the third position and storing said transformed second perspective view in a buffer,
transforming the first perspective view to correspond to a view from the third position and storing said transformed first perspective view in the buffer such that the pixel values of the transformed second perspective view are overwritten unless no information for that pixel value is provided by the transformed first perspective view.

18. A method as claimed in claim 17, further comprising taking a sample from at least one of the first, second and third perspective views.

19. A method as claimed in claim 16, wherein any pixel not defined in an interpolated view is given a value equal to the nearest calculated pixel value.

20. A method as claimed in claim 3, wherein a sample for a particular combination of pixel of the 2D display and aperture of the autostereoscopic display is only calculated if that sample is determined to be used for determining the value for a pixel that will be viewable on the autostereoscopic display.

21. A method as claimed in claim 3, wherein a sample is taken such that the center line of projection passes through both the center point or line on the aperture and the center of the pixel on the 2D display.

22. A method as claimed in claim 3, wherein a sample or off-center sample is taken such that the center line of projection passes through both the center point or line on the aperture and any point of the pixel on the 2D display.

23. A method as claimed in claim 3 wherein each sample is taken such that the center line of projection passes through the center of the aperture.

24. A method as claimed in claim 3 wherein each sample is taken such that the center line of projection passes through a point or line on the aperture which is offset from the center of the aperture.

25. A method as claimed in claim 24, wherein the point or line on the aperture which is offset from the center of the aperture is at least one of: an edge of a virtual aperture and the midpoint between two adjacent virtual apertures.

26. A method as claimed in claim 3, further comprising applying a low pass filter to the 3D scene prior to a sample being taken.

27. A method as claimed in claim 26, wherein the low pass filter has a low pass frequency dependent on a z-value of the 3D scene.

28. A method as claimed in claim 26, wherein the low pass filter has a low pass frequency dependent on z-value of the 3D scene and on the width of the 3D pixel for that z-value.

29. A method as claimed in claim 27, wherein the dependence of the low pass frequency is identified by use of a lookup table.

30. A method as claimed in claim 3, further comprising applying tessellation to the 3D scene prior to a sample being taken.

31. A method as claimed in claim 30, further comprising tessellating triangles larger than a threshold value into smaller triangles.

32. A method as claimed in claim 31, wherein the threshold value for tessellation is dependent on the z value of the vertices of the triangle.

33. A method as claimed in claim 3, wherein volumetric data of the 3D scene is stored in a 3D data structure such that any voxel value can be found through a read operation.

34. A method as claimed in claim 3, wherein at least one sample is taken using ray tracing.

35. A method as claimed in claim 3, wherein at least one sample is taken using rasterization.

36. A method as claimed in claim 3, the method further comprising taking at least one sample by performing a transformation and a projection, wherein the transformation comprises calculating a transformation dependent on the geometry of the autostereoscopic display and the projection comprises calculating a projection dependent on a projection plane.

37. A method as claimed in claim 3, the method further comprising taking a plurality of samples of the 3D scene for at least one further aperture of the autostereoscopic display.

38. A method as claimed in claim 3, the method further comprising taking a plurality of samples of the 3D scene for all apertures of the autostereoscopic display.

39. A method as claimed in claim 3, wherein the group of pixel and aperture combinations for which samples are taken is optimized for at least one of: a particular viewing line, a particular viewing area, a particular viewing volume a particular volume of the 3D scene, and a characteristic of the autostereoscopic display.

40. An autostereoscopic display apparatus arranged to perform the method of claim 3.

41. A graphics processing apparatus for use in a computer system having an autostereoscopic display, the graphics processing apparatus arranged to perform the method of claim 3.

42. A graphics processing apparatus for use in an autostereoscopic display, the graphics processing apparatus arranged to perform the method of claim 3.

43. A non-transitory computer readable medium comprising code for performing the method of claim 3.

* * * * *